US012677198B2

(12) United States Patent
Belleschi et al.

(10) Patent No.: US 12,677,198 B2
(45) Date of Patent: Jul. 7, 2026

(54) ENHANCEMENTS TO MRO IN CASE OF RLF AFTER SUCCESSFUL (CONDITIONAL) HANDOVER

(71) Applicant: Telefonaktiebolaget LM Ericsson (publ), Stockholm (SE)

(72) Inventors: Marco Belleschi, Solna (SE); Pradeepa Ramachandra, Linköping (SE); Ali Parichehrehteroujeni, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 349 days.

(21) Appl. No.: 18/280,492

(22) PCT Filed: Mar. 11, 2022

(86) PCT No.: PCT/IB2022/052223
§ 371 (c)(1),
(2) Date: Sep. 6, 2023

(87) PCT Pub. No.: WO2022/190065
PCT Pub. Date: Sep. 15, 2022

(65) Prior Publication Data
US 2024/0147322 A1 May 2, 2024

Related U.S. Application Data

(60) Provisional application No. 63/160,381, filed on Mar. 12, 2021.

(51) Int. Cl.
H04L 5/00 (2006.01)
H04W 24/02 (2009.01)
(Continued)

(52) U.S. Cl.
CPC ....... H04W 36/0079 (2018.08); H04W 24/02 (2013.01); H04W 36/362 (2023.05)

(58) Field of Classification Search
CPC ............... H04W 24/02; H04W 36/362; H04W 36/0079; H04W 36/08; H04W 36/32;
(Continued)

(56) References Cited

U.S. PATENT DOCUMENTS

2019/0223073 A1* 7/2019 Chen ................. H04W 36/0077

FOREIGN PATENT DOCUMENTS

EP          3780742 A1     2/2021

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 16)," Technical Specification 36.300, Version 16.4.0, Dec. 2020, 3GPP Organizational Partners, 391 pages.

(Continued)

*Primary Examiner* — Phuoc H Doan
(74) *Attorney, Agent, or Firm* — Withrow & Terranova, PLLC

(57) ABSTRACT
Systems and methods are disclosed for enhancements to Mobility Robustness Optimization (MRO) in case of Radio Link Failure (RLF) after successful (conditional) handover. In one embodiment, a method performed by a wireless device comprises receiving a handover (HO) configuration or conditional handover (CHO) configuration from a source cell and declaring a RLF in association with a HO or CHO to a target cell. The method further comprises generating a RLF report responsive to declaring the RLF, the RLF report comprising the HO configuration or CHO configuration, a successful HO report, information about one or more associated time durations, one or more radio link measurements for one or more CHO candidate cells associated to the CHO configuration received from the source cell, or any combi- (Continued)

*Scenario of "RLF or HOF after receiving a CHO configuration executed after a successful HO"* nation thereof. The method further comprises transmitting the RLF report to a network node.

14 Claims, 16 Drawing Sheets

(51) Int. Cl.
*H04W 36/00* (2009.01)
*H04W 36/36* (2009.01)

(58) Field of Classification Search
CPC . H04W 36/30; H04W 84/042; H04B 7/18506
See application file for complete search history.

(56) References Cited

OTHER PUBLICATIONS

Author Unknown, "Technical Specification Group Radio Access Network; Evolved Universal Terrestrial Radio Access (E-UTRA); Radio Resource Control (RRC); Protocol specification (Release 16)," Technical Specification 36.331, Version 16.3.0, Dec. 2020, 3GPP Organizational Partners, 1,084 pages.
Author Unknown, "Technical Specification Group Radio Access Network; Evolved Univesal Terrestrial Radio Access Network (E-UTRAN); X2 application protocol (X2AP) (Release 16)," Technical Specification 36.423, Version 16.4.0, Jan. 2021, 3GPP Organizational Partners, 500 pages.
Author Unknown, "Technical Specification Group Radio Access Network; NR; NR and NG-RAN Overall Description; Stage 2 (Release 16)," Technical Specification 38.300, Version 16.4.0, Dec. 2020, 3GPP Organizational Partners, 149 pages.
Author Unknown, "Technical Specification Group Radio Access Network; NR; Radio Resource Control (RRC) protocol specification (Release 16)," Technical Specification 38.331, Version 16.3.0, Dec. 2020, 3GPP Organizational Partners, 932 pages.
Ericsson, "R2-2010615: An indication of reconfiguration with sync type in RLF report," 3GPP TSG-RAN WG2 Meeting #112-e, Nov. 2-13, 2020, Electronic Meeting, 13 pages.
Ericsson, "R2-2108961: [AT115e][851][SON/MDT] CHO and DAPS related RLF reports (Ericsson)," 3GPP TSG-RAN WG2 #115-e, Aug. 16-27, 2021, Electronic Meeting, 13 pages.
Ericsson, "R3-205023: Mobility Robustness Optimization for Conditional Handover," 3GPP TSG-RAN3 #109-e, Aug. 17-28, 2020, Electronic Meeting, 10 pages.
Qualcomm Incorporated, "R2-1909878: LTE Conditional HO failure handling," 3GPP TSG-RAN WG2 Meeting #107, Aug. 26-30, 2019, Prague, Czech Republic, 5 pages.
International Search Report and Written Opinion for International Patent Application No. PCT/IB2022/052223, mailed Jun. 20, 2022, 18 pages.

* cited by examiner

*Handover in LTE*

*Handover in LTE*

Ramifications of Self-Configuration/Self-Optimization functionality (from 3GPP TS 36.300 figure 22.1-1)

*Scenario of "RLF or HOF after receiving a CHO configuration executed after a successful HO"*

FIG. 7A

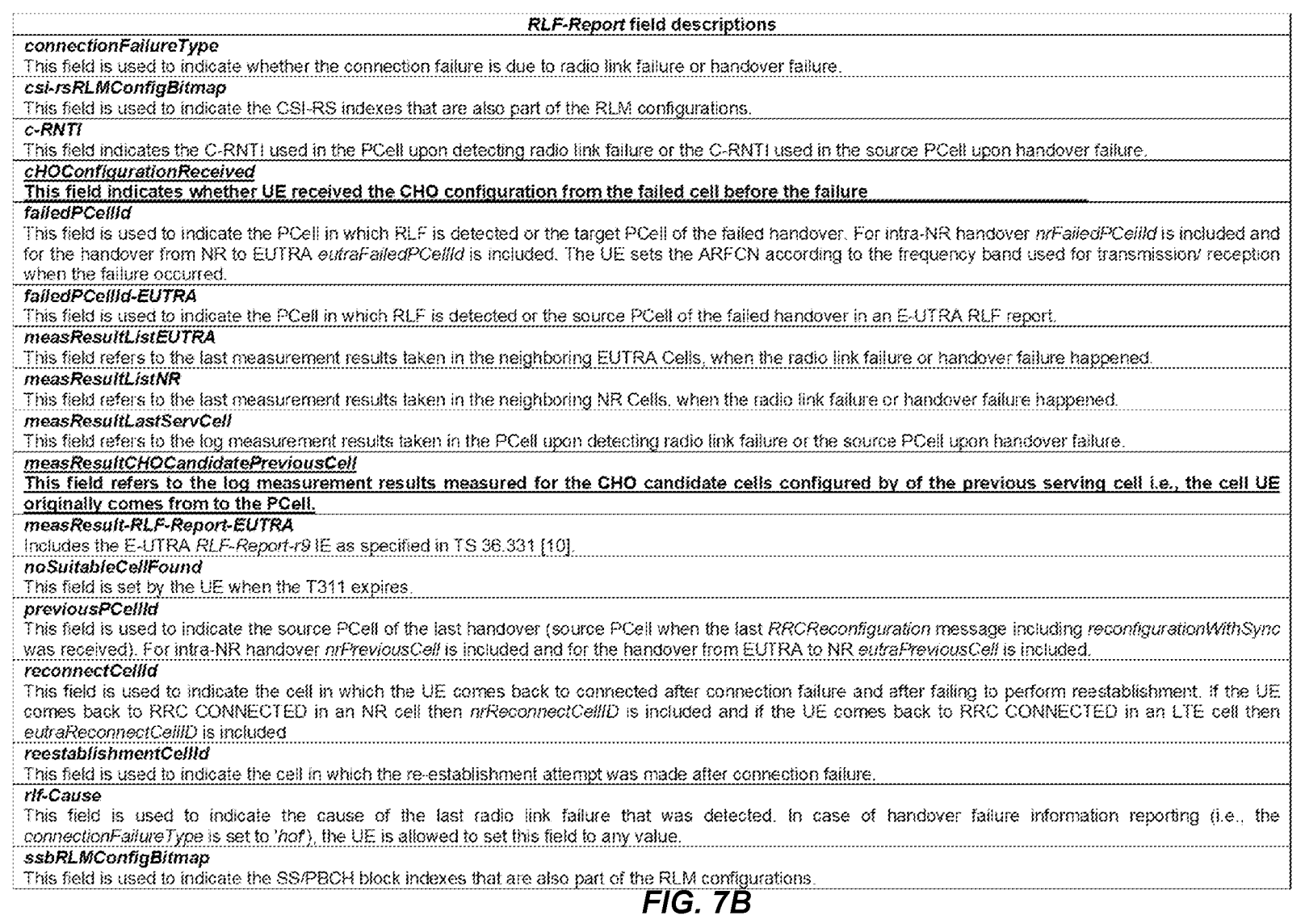

RLF-Report field descriptions

*connectionFailureType*
This field is used to indicate whether the connection failure is due to radio link failure or handover failure.

*csi-rsRLMConfigBitmap*
This field is used to indicate the CSI-RS indexes that are also part of the RLM configurations.

*c-RNTI*
This field indicates the C-RNTI used in the PCell upon detecting radio link failure or the C-RNTI used in the source PCell upon handover failure.

*cHOConfigurationReceived*
This field indicates whether UE received the CHO configuration from the failed cell before the failure

*failedPCellId*
This field is used to indicate the PCell in which RLF is detected or the target PCell of the failed handover. For intra-NR handover nrFailedPCellId is included and for the handover from NR to EUTRA eutraFailedPCellId is included. The UE sets the ARFCN according to the frequency band used for transmission/ reception when the failure occurred.

*failedPCellId-EUTRA*
This field is used to indicate the PCell in which RLF is detected or the source PCell of the failed handover in an E-UTRA RLF report.

*measResultListEUTRA*
This field refers to the last measurement results taken in the neighboring EUTRA Cells, when the radio link failure or handover failure happened

*measResultListNR*
This field refers to the last measurement results taken in the neighboring NR Cells, when the radio link failure or handover failure happened

*measResultLastServCell*
This field refers to the log measurement results taken in the PCell upon detecting radio link failure of the source PCell upon handover failure.

*measResultCHOCandidatePreviousCell*
This field refers to the log measurement results measured for the CHO candidate cells configured by of the previous serving cell i.e., the cell UE originally comes from to the PCell.

*measResult-RLF-Report-EUTRA*
Includes the E-UTRA RLF-Report-r9 IE as specified in TS 36.331 [10].

*noSuitableCellFound*
This field is set by the UE when the T311 expires.

*previousPCellId*
This field is used to indicate the source PCell of the last handover (source PCell when the last RRCReconfiguration message including reconfigurationWithSync was received). For intra-NR handover nrPreviousCell is included and for the handover from EUTRA to NR eutraPreviousCell is included

*reconnectCellId*
This field is used to indicate the cell in which the UE comes back to connected after connection failure and after failing to perform reestablishment. If the UE comes back to RRC CONNECTED in an NR cell then nrReconnectCellId is included and if the UE comes back to RRC CONNECTED in an LTE cell then eutraReconnectCellId is included

*reestablishmentCellId*
This field is used to indicate the cell in which the re-establishment attempt was made after connection failure.

*rlf-Cause*
This field is used to indicate the cause of the last radio link failure that was detected. In case of handover failure information reporting (i.e., the connectionFailureType is set to 'hof'), the UE is allowed to set this field to any value.

*ssbRLMConfigBitmap*
This field is used to indicate the SS/PBCH block indexes that are also part of the RLM configurations.

*FIG. 7B*

ENHANCEMENTS TO MRO IN CASE OF
RLF AFTER SUCCESSFUL (CONDITIONAL)
HANDOVER

RELATED APPLICATIONS

This application is a 35 U.S.C. § 371 national phase filing of International Application No. PCT/IB2022/052223, filed Mar. 11, 2022, which claims the benefit of provisional patent application Ser. No. 63/160,381, filed Mar. 12, 2021, the disclosures of which are hereby incorporated herein by reference in their entireties.

TECHNICAL FIELD

The present disclosure relates to Radio Link Failure (RLF) reporting in a cellular network.

BACKGROUND

Wireless Communication Systems in 3GPP

Consider the simplified wireless communication system illustrated in FIG. 1, with a User Equipment (UE) 102, which communicates with one or multiple access nodes 103-104, which in turn is(are) connected to a network node 106 (e.g., a network node in an associated core network). The access nodes 103-104 are part of the radio access network 100.

For wireless communication systems pursuant to Third Generation Partnership Project (3GPP) Evolved Packet System (EPS), which is also referred to as Long Term Evolution (LTE) or Fourth Generation (4G), standard specifications, such as specified in 3GPP Technical Specification (TS) 36.300 and related specifications, each of the access nodes 103-104 corresponds typically to an Evolved Node B (eNB) and the network node 106 corresponds typically to either a Mobility Management Entity (MME) and/or a Serving Gateway (SGW). The eNB is part of the radio access network 100, which in this case is the Evolved Universal Terrestrial Radio Access Network (E-UTRAN), while the MME and SGW are both part of the Evolved Packet Core (EPC). The eNBs are inter-connected via the X2 interface and connected to the EPC via the S1 interface, more specifically via the S1-C interface to the MME and S1-U interface to the SGW.

For wireless communication systems pursuant to 3GPP Fifth Generation (5G) System (5GS), which is also referred to as New Radio (NR) or 5G, standard specifications, such as specified in 3GPP TS 38.300 and related specifications, on the other hand, each of the access nodes 103-104 corresponds typically to an 5G Node B (gNB) and the network node 106 corresponds typically to either an Access and Mobility Management Function (AMF) and/or a User Plane Function (UPF). The gNB is part of the radio access network 100, which in this case is the Next Generation Radio Access Network (NG-RAN), while the AMF and UPF are both part of the 5G Core (5GC). The gNBs are inter-connected via the Xn interface and connected to the 5GC via the NG interface, more specifically via NG-C to the AMF and NG-U to the UPF.

To support fast mobility between NR and LTE and avoid change of core network, LTE eNBs can also be connected to the 5GC via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification, it refers to LTE-EPC.

Mobility in RRC_CONNECTED in LTE and NR

Mobility in RRC_CONNECTED state is also known as handover. The purpose of handover is to move the UE, due to, e.g., mobility, from a source access node using a source radio connection (also known as source cell connection) to a target access node using a target radio connection (also known as target cell connection). The source radio connection is associated with a source cell controlled by the source access node. The target radio connection is associated with a target cell controlled by the target access node. In other words, during a handover, the UE moves from the source cell to a target cell. Sometimes the source access node or the source cell is referred to as the "source", and the target access node or the target cell is sometimes referred to as the "target".

In some cases, the source access node and target access node are different nodes, such as different eNBs or gNBs. These cases are also referred to as inter-node handover, inter-eNB handover, or inter-gNB handover. In other cases, the source access node and target access node are the same node, such as the same eNB and gNB. These cases are also referred to as intra-node handover, intra-eNB handover, or intra-gNB handover and covers the case then source and target cells are controlled by the same access node. In yet other cases, handover is performed within the same cell (and thus also within the same access node controlling that cell)—these cases are also referred to as intra-cell handover.

It should therefore be understood that the terms "source access node" and "target access node" refer to roles served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as both the source access node and target access node for that UE.

An RRC_CONNECTED UE in E-UTRAN or NG-RAN can be configured by the network to perform measurements of serving and neighbor cells, and, based on the measurement reports sent by the UE, the network may decide to perform a handover of the UE to a neighbor cell. The network then sends a Handover Command message to the UE (in LTE an RRConnectionReconfiguration message with a field called mobilityControlInfo and in NR an RRCReconfiguration message with a reconfigurationWithSync field).

These reconfigurations are actually prepared by the target access node upon a request from the source access node (over X2 or S1 interface in case of EUTRA-EPC or Xn or NG interface in case of NG-RAN-5GC), where the target access node takes into account the existing RRC configuration and UE capabilities as provided in the request from the source access node and its own capabilities and resource situation in the intended target cell. The reconfiguration parameters provided by the target access node contain, for example, information needed by the UE to access the target access node, e.g., random access configuration, a new Cell Radio Network Temporary Identifier (C-RNTI) assigned by the target access node and security parameters enabling the UE to calculate new security keys associated to the target access node so the UE can send a Handover Complete message (in LTE an RRConnectionReconfigurationComplete message and in NR an RRCReconfigurationComplete message) on SRB1 encrypted and integrity protected based on new security keys upon accessing the target access node.

FIGS. 2A and 2B summarize the signaling flow between UE, source access node (also known as source gNB, source eNB, or source cell), and target access node (also known as target gNB, target eNB, or target cell) during a handover procedure, using LTE as example.

User Plane Handling During Handover

Depending on the required QoS, either a seamless or a lossless handover is performed as appropriate for each user plane radio bearer, as explained below.

Seamless handover is applied for user plane radio bearers mapped on Radio Link Control (RLC) Unacknowledged Mode (UM). These types of data are typically reasonably tolerant of losses but less tolerant of delay (e.g., voice services). Seamless handover is therefore designed to minimize complexity and delay but may result in loss of some Packet Data Convergence Protocol (PDCP) Service Data Units (SDUs).

At handover, for radio bearers to which seamless handover applies, the PDCP entities including the header compression contexts are reset, and the COUNT values are set to zero. As a new key is generated at handover, there is no security reason to maintain the COUNT values. PDCP SDUs in the UE for which the transmission has not yet started will be transmitted after handover to the target access node. In the source access node, PDCP SDUs that have not yet been transmitted can be forwarded via the X2/Xn interface to the target access node. PDCP SDUs for which the transmission has already started but that have not been successfully received will be lost. This minimizes the complexity because no context (i.e., configuration information) has to be transferred between the source access node and the target access node at handover.

In regard to lossless handover, based on the Sequence Number (SN) that is added to PDCP Data PDUs, it is possible to ensure in-sequence delivery during handover, and even provide a fully lossless handover functionality, by performing retransmission of PDCP SDUs for which reception has not yet been acknowledged prior to the handover. This lossless handover function is used mainly for delay-tolerant services such as file downloads where the loss of one PDCP SDU can result in a drastic reduction in the data rate due to the reaction of the Transmission Control Protocol (TCP).

Lossless handover is applied for user plane radio bearers that are mapped on RLC Acknowledged Mode (AM). When RLC AM is used, PDCP SDUs that have been transmitted but not yet been acknowledged by the RLC layer are stored in a retransmission buffer in the PDCP layer.

In order to ensure lossless handover in the downlink (DL), the source access node forwards the DL PDCP SDUs stored in the retransmission buffer as well as fresh DL PDCP SDUs received from the gateway to the target access node for (re-)transmission. The source access node receives an indication from the core network gateway (SGW in LTE/EPC, UPF in LTE/5GC and NR) that indicates the last packet sent to the source access node (a so called "end marker" packet). The source access node also forwards this indication to the target access node 104 so that the target access node knows when it can start transmission of packets received directly from the gateway.

In order to ensure lossless handover in the uplink (UL), the UE retransmits the UL PDPC SDUs that are stored in the PDCP retransmission buffer in the target access node. The retransmission is triggered by the PDCP re-establishment that is performed upon reception of the handover command. The source access node, after decryption and decompression, will forward all PDCP SDUs received out of sequence to the target access node. Thus, the target access node 104 can reorder the PDCP SDUs received from the source access node 103 and the retransmitted PDCP SDUs received from the UE based on the PDCP SNs which are maintained during the handover, and deliver them to the gateway in the correct sequence.

An additional feature of lossless handover is so-called selective retransmission. In some cases, it may happen that a PDCP SDU has been successfully received, but a corresponding RLC acknowledgement has not. In this case, after the handover, there may be unnecessary retransmissions initiated by the UE or the target access node based on the incorrect status received from the RLC layer. In order to avoid these unnecessary retransmissions, a PDCP status report can be sent from the target access node to the UE and from the UE to the target access node. Whether to send a PDCP status report after handover is configured independently for each radio bearer and for each direction.

Self-Organizing Networks (SON) in 3GPP

A Self-Organizing Network (SON) is an automation technology designed to make the planning, configuration, management, optimization, and healing of mobile radio access networks simpler and faster. SON functionality and behavior has been defined and specified in generally accepted mobile industry recommendations produced by organizations such as 3GPP and the Next Generation Mobile Networks (NGMN).

In 3GPP, the processes within the SON area are classified into a self-configuration process and a self-optimization process. The self-configuration process is the process where newly deployed nodes are configured by automatic installation procedures to get the necessary basic configuration for system operation. This process works in the pre-operational state. The pre-operational state is understood as the state from when the eNB is powered up and has backbone connectivity until the radio frequency (RF) transmitter is switched on. As illustrated in FIG. 3, functions handled in the pre-operational state such as basic setup and initial radio configuration are covered by the self-configuration process.

The self-optimization process is defined as the process where UE and access node measurements and performance measurements are used to auto-tune the network. This process works in operational state. The operational state is understood as the state where the RF interface is additionally switched on. As described in FIG. 3, functions handled in the operational state such as optimization/adaptation are covered by the self-optimization process.

In LTE, support for Self-Configuration and Self-Optimization is specified, as described in 3GPP TS 36.300 section 22.2, including features such as Dynamic configuration, Automatic Neighbor Relation (ANR), Mobility load balancing, Mobility Robustness Optimization (MRO), and Random Access Channel (RACH) optimization. support for energy saving.

In NR, support for Self-Configuration and Self-Optimization is specified as well, starting with Self-Configuration features such as Dynamic configuration and ANR in Release 15, as described in 3GPP TS 38.300 section 15. In NR Rel-16, more SON features are being specified for, e.g., Mobility Robustness Optimization (MRO).

Mobility Robustness Optimization (MRO) in 3GPP

Seamless handovers are a key feature of 3GPP technologies. Successful handovers ensure that the UE moves around in the coverage area of different cells without causing too many interruptions in the data transmission. However, there will be scenarios when the network fails to handover the UE to the "correct" neighbor cell in time and, in such scenarios, the UE will declare a Radio Link Failure (RLF) or Handover Failure (HOF).

Upon HOF and RLF, the UE may take autonomous actions such as trying to select a cell and initiating reestablishment procedure so that it is ensured that the UE is trying to get reconnected as soon as it can, so that it can be reachable again. The RLF will cause a poor user experience as the RLF is declared by the UE only when it realizes that there is no reliable communication channel (radio link) available between itself and the network. Also, reestablishing the connection requires signaling with the newly selected cell (random access procedure, Radio Resource Control (RRC) Reestablishment Request, RRC Reestablishment, RRC Reestablishment Complete, RRC Reconfiguration, and RRC Reconfiguration Complete) and adds some latency, until the UE can exchange data with the network again.

According to the 3GPP specifications (see 3GPP TS 36.331), the possible causes for the RLF could be one of the following:

1) Expiry of the radio link monitoring related timer T310;
2) Expiry of the measurement reporting associated timer T312 (not receiving the handover command from the network within this timer's duration despite sending the measurement report when T310 was running);
3) Upon reaching the maximum number of RLC retransmissions;
4) Upon receiving random access problem indication from the Medium Access Control (MAC) entity;

As RLF leads to reestablishment which degrades performance and user experience, it is in the interest of the network to understand the reasons for RLF and try to optimize mobility related parameters (e.g., trigger conditions of measurement reports) to avoid later RLFs. Before the standardization of MRO related report handling in the network, only the UE was aware of some information associated to what the radio quality looked like at the time of RLF, what is the actual reason for declaring RLF, etc. For the network to identify the reason for the RLF, the network needs more information, both from the UE and also from the neighboring base stations.

As part of the MRO solution in LTE, the RLF reporting procedure was introduced in the RRC specification in Rel-9 RAN2 work. That has impacted the RRC specifications (see 3GPP TS 36.331) in the sense that it was standardized that the UE would log relevant information at the moment of an RLF and later report this information to a target cell to which the UE successfully connects (e.g., after reestablishment). That has also impacted the inter-gNB interface, i.e., X2AP specifications (3GPP TS 36.423), as an eNB receiving an RLF report could forward the report to the eNB where the failure originated.

For the RLF report generated by the UE, its contents have been enhanced with more details in subsequent releases of the 3GPP standards. The measurements included in the measurement report based on the latest LTE RRC specification are:

1) Measurement quantities (Reference Signal Received Power (RSRP), Reference Signal Received Quality (RSRQ)) of the last serving cell (Primary Cell (PCell)).
2) Measurement quantities of the neighbor cells in different frequencies of different Radio Access Technologies (RATs) (EUTRA, UTRA, GERAN, CDMA2000).
3) Measurement quantity (Received Strength of Signal Indication (RSSI)) associated to Wireless Local Area Network (WLAN) access points (APs).
4) Measurement quantity (RSSI) associated to Bluetooth beacons.
5) Location information, if available (including location coordinates and velocity)
6) Globally unique identity of the last serving cell, if available, otherwise the Physical Cell Identity (PCI) and the carrier frequency of the last serving cell.
7) Tracking area code of the PCell.
8) Time elapsed since the last reception of the 'Handover command' message.
9) C-RNTI used in the previous serving cell.
10) Whether or not the UE was configured with a Data Radio Bearer (DRB) having Quality of Service (QoS) Class Identifier (QCI) value of 1.

After the RLF is declared, the RLF report is logged and included in the VarRLF-Report. Once the UE selects a cell and succeeds with a reestablishment, the UE includes an indication that it has an RLF report available in the RRC Reestablishment Complete message to make the target cell aware of that availability. Then, upon receiving an UEInformationRequest message with a flag "rlf-ReportReq-r9", the UE includes the RLF report (stored in a UE variable VarRLF-Report, as described above) in an UEInformationResponse message and sends the UEInformationResponse message to the network.

Based on the RLF report from the UE and the knowledge about the cell in which the UE reestablished itself, the original source cell can deduce whether the RLF was caused due to a coverage hole or due to handover associated parameter configurations. If the RLF was deemed to be due to handover associated parameter configurations, the original serving cell can further classify the handover related failure as too-early, too-late, or handover to wrong cell classes. These handover failure classes are explained in brief below.

1) Whether the handover failure occurred due to the 'too-late handover' cases
   a. The original serving cell can classify a handover failure to be 'too late handover' when the original serving cell fails to send the handover command to the UE associated to a handover towards a particular target cell and if the UE reestablishes itself in this target cell post RLF.
   b. An example corrective action from the original serving cell could be to initiate the handover procedure towards this target cell a bit earlier by decreasing the CIO (cell individual offset) towards the target cell that controls when the IE sends the event triggered measurement report that leads to taking the handover decision.
2) Whether the handover failure occurred due to the 'too-early handover' cases
   a. The original serving cell can classify a handover failure to be 'too early handover' when the original serving cell is successful in sending the handover command to the UE associated to a handover how-
ever the UE fails to perform the random access
towards this target cell.
  b. An example corrective action from the original
    serving cell could be to initiate the handover proce-
    dure towards this target cell a bit later by increasing
    the CIO (cell individual offset) towards the target
    cell that controls when the IE sends the event trig-
    gered measurement report that leads to taking the
    handover decision.
3) Whether the handover failure occurred due to the
  'handover-to-wrong-cell' cases
  a. The original serving cell can classify a handover
    failure to be 'handover-to-wrong-cell' when the
    original serving cell intends to perform the handover
    for this UE towards a particular target cell but the UE
    declares the RLF and reestablishes itself in a third
    cell.
  A corrective action from the original serving cell could be
to initiate the measurement reporting procedure that leads to
handover towards the target cell a bit later by decreasing the
CIO (cell individual offset) towards the target cell or via
initiating the handover towards the cell in which the UE
reestablished a bit earlier by increasing the CIO towards the
reestablishment cell.

SUMMARY

Systems and methods are disclosed for enhancements to
Mobility Robustness Optimization (MRO) in case of Radio
Link Failure (RLF) after successful (conditional) handover.
In one embodiment, a method performed by a wireless
device for handover (HO) from a source cell to a target cell
comprises receiving a HO configuration or conditional han-
dover (CHO) configuration from a source cell and declaring
a RLF in association with a HO or CHO to a target cell. The
method further comprises generating a RLF report respon-
sive to declaring the RLF, the RLF report comprising: (a) the
HO configuration or CHO configuration received from the
source cell, (b) a successful HO report associated to the HO
or CHO to the target cell, (c) information about an amount
of time between successfully completing the HO or CHO to
the target cell and reception of a new HO configuration or
new CHO configuration from the target cell, (d) information
about an amount of time between successfully completing
the HO to the target cell and declaring the RLF while being
connected to the target cell, (e) one or more radio link
measurements for one or more CHO candidate cells asso-
ciated to the CHO configuration received from the source
cell, (f) a value of a timer related to a predefined or
preconfigured amount of time that the wireless device
should keep the successful HO report, or (g) a combination
any two or more of (a)-(f). The method further comprises
transmitting the RLF report to a network node. In this
manner, the network is enabled to better classify mobility
failure types.
  In one embodiment, the method further comprises suc-
cessfully completing a HO or CHO to the target cell,
wherein declaring the RLF comprises declaring the RLF
while being connected to the target cell. In one embodiment,
the method further comprises retaining the HO configuration
or the CHO configuration received from the source cell after
successfully completing the HO to the target cell. In one
embodiment, retaining the HO configuration or the CHO
configuration received from the source cell after success-
fully completing the HO to the target cell comprises retain-
ing the HO configuration or the CHO configuration received from the source cell at least until the wireless device
executes a handover from the target cell to another cell. In
another embodiment, retaining the HO configuration or the
CHO configuration received from the source cell after
successfully completing the HO to the target cell comprises
retaining the HO configuration or the CHO configuration
received from the source cell at least until the wireless
device receives a new CHO configuration from the target
cell. In another embodiment, retaining the HO configuration
or the CHO configuration received from the source cell after
successfully completing the HO to the target cell comprises
retaining the HO configuration or the CHO configuration
received from the source cell at least until declaring the RLF
while connected to the target cell. In another embodiment,
retaining the HO configuration or the CHO configuration
received from the source cell after successfully completing
the HO to the target cell comprises retaining the HO
configuration or the CHO configuration received from the
source cell at least until a predefined or network configured
timer has expired. In one embodiment, the RLF report
comprises one or more radio link measurements for one or
more CHO candidate cells associated to the CHO configu-
ration received from the source cell.
  In one embodiment, the method further comprises dis-
carding the HO configuration or the CHO configuration
received from the source cell after successfully completing
the HO to the target cell.
  In one embodiment, the RLF report comprises the infor-
mation about the amount of time between successfully
completing the HO to the target cell and reception of a new
HO configuration or new CHO configuration from the target
cell. In one embodiment, the method further comprises
starting a first timer for the amount of time between suc-
cessfully completing the HO to the target cell and reception
of a new HO configuration or new CHO configuration from
the target cell, receiving a new CHO configuration from the
target cell, and stopping the first timer responsive to receiv-
ing the new CHO configuration from the target cell, wherein
the RLF report comprises a value of the first timer.
  In one embodiment, the RLF report comprises the infor-
mation about the amount of time between successfully
completing the HO to the target cell and declaring the RLF
while being connected to the target cell. In one embodiment,
the method further comprises starting a second timer for the
amount of time between successfully completing the HO to
the target cell and declaring the RLF while being connected
to the target cell, responsive to successfully completing the
HO to the target cell. The method further comprises stopping
the second timer responsive to declaring the RLF while
being connected to the target cell, wherein the RLF report
comprises a value of the second timer.
  In one embodiment, the method further comprises gen-
erating and storing a successful HO report responsive to
successfully completing the HO to the target cell. In one
embodiment, the method further comprises transmitting the
successful HO report to the target cell. In one embodiment,
the method further comprises including, in an internal copy
of the successful HO report, an indication that the successful
HO report has been transmitted.
  In one embodiment, the method further comprises deter-
mining that a predefined or preconfigured amount of time
has expired since generating and storing the successful HO
report. The method further comprises, responsive to deter-
mining that the predefined or preconfigured amount of time
has expired, discarding the successful HO report or storing
a flag in the successful HO report that indicates that the
predefined or preconfigured amount of time has expired.

In one embodiment, the RLF report comprises the successful HO report.

Corresponding embodiments of a wireless device are also disclosed. In one embodiment, a wireless device for HO from a source cell to a target cell, the wireless device being adapted to receive a HO configuration or CHO configuration from a source cell, declare a RLF in association with a HO or CHO to a target cell, and generate a RLF report responsive to declaring the RLF, the RLF report comprising: (a) the HO configuration or CHO configuration received from the source cell, (b) a successful HO report associated to the HO or CHO to the target cell, (c) information about an amount of time between successfully completing the HO or CHO to the target cell and reception of a new HO configuration or new CHO configuration from the target cell, (d) information about an amount of time between successfully completing the HO to the target cell and declaring the RLF while being connected to the target cell, (e) one or more radio link measurements for one or more CHO candidate cells associated to the CHO configuration received from the source cell, (f) a value of a timer related to a predefined or preconfigured amount of time that the wireless device should keep the successful HO report, or (g) a combination any two or more of (a)-(f). The wireless device is further adapted to transmit the RLF report to a network node.

In one embodiment, a wireless device for HO from a source cell to a target cell comprises an interface comprising radio front end circuitry and processing circuitry associated with the interface. The processing circuitry is configured to cause the wireless device to receive a HO configuration or CHO configuration from a source cell, declare a RLF in association with a HO or CHO to a target cell, and generate a RLF report responsive to declaring the RLF, the RLF report comprising: (a) the HO configuration or CHO configuration received from the source cell, (b) a successful HO report associated to the HO or CHO to the target cell, (c) information about an amount of time between successfully completing the HO or CHO to the target cell and reception of a new HO configuration or new CHO configuration from the target cell, (d) information about an amount of time between successfully completing the HO to the target cell and declaring the RLF while being connected to the target cell, (e) one or more radio link measurements for one or more CHO candidate cells associated to the CHO configuration received from the source cell, (f) a value of a timer related to a predefined or preconfigured amount of time that the wireless device should keep the successful HO report, or (g) a combination any two or more of (a)-(f). The processing circuitry is further configured to cause the wireless device to transmit the RLF report to a network node.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 7A and 7B illustrate an example embodiment of an RLF report in accordance with an embodiment of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. Initial Matters:

As used herein, the term "cell A" refers to a first cell hosted by a network node (e.g., a Distributed Unit (DU) of a 5G Node B (gNB)) from which the User Equipment (UE) executes the handover to a second cell, i.e., said "cell B".

As used herein, the term "cell B" refers to a second cell hosted by a network node (e.g., a DU of a gNB) to which the UE executes the handover from the first cell, i.e., cell A.

Figure 1:
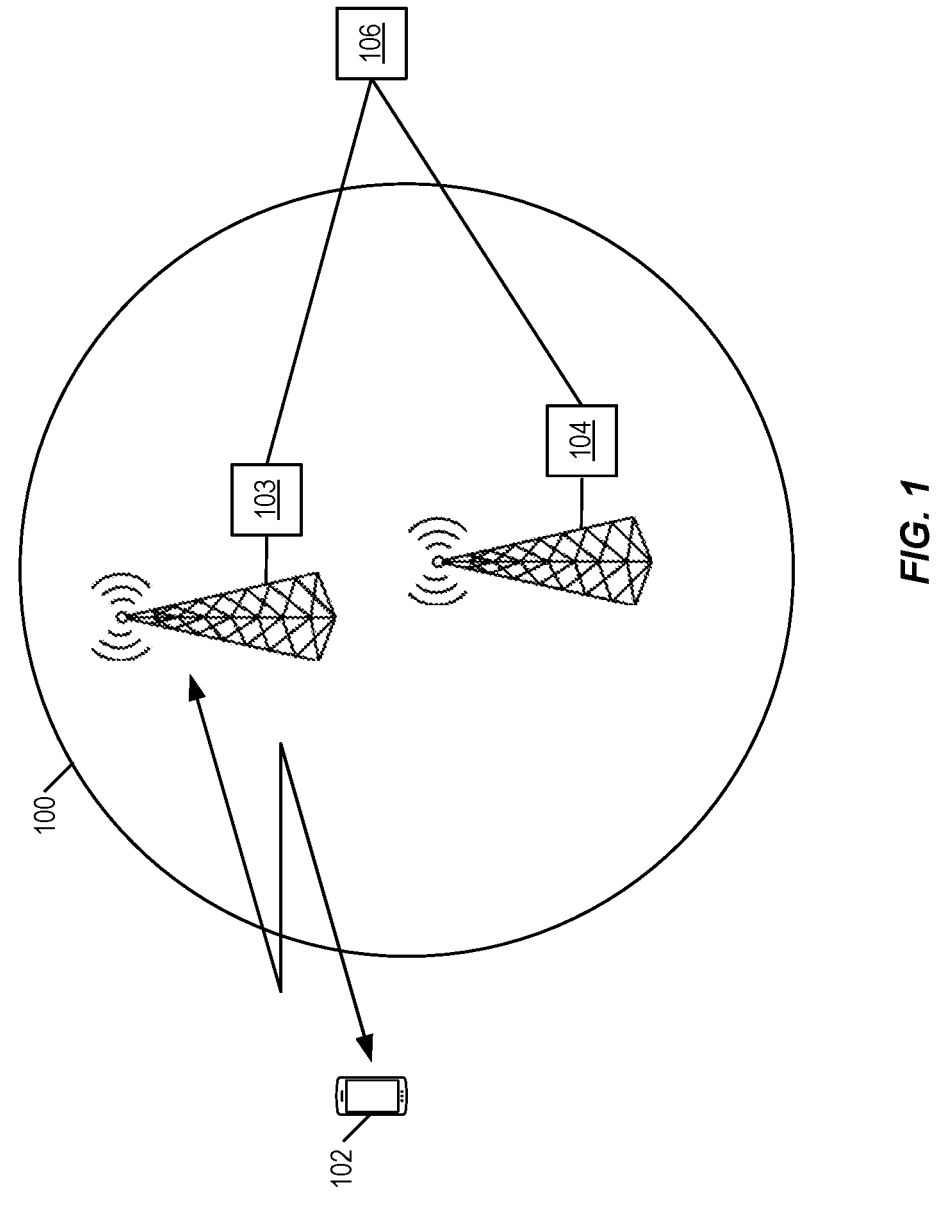
FIG. 1 illustrates one example of a wireless communication system.
Figure 2A:
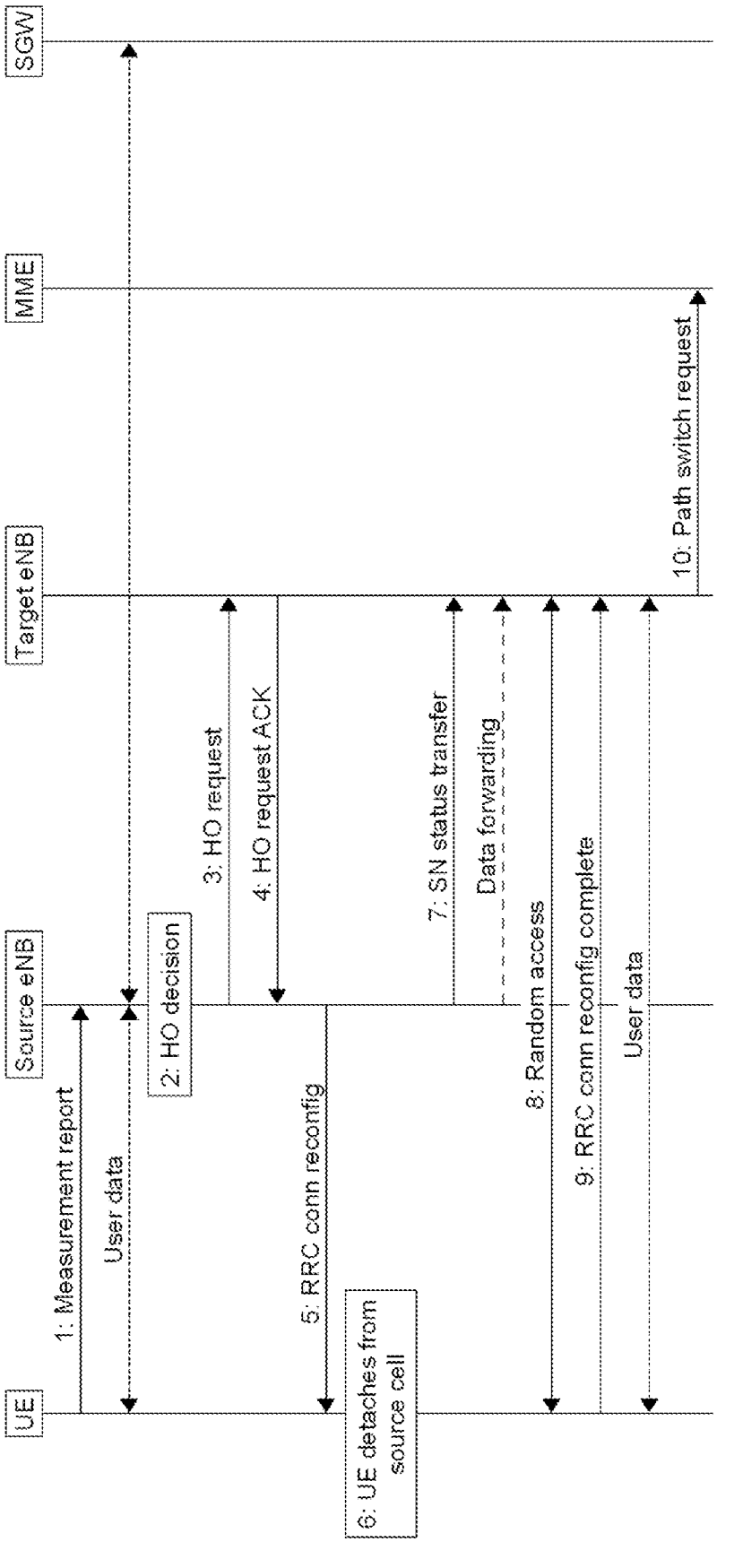
FIGS. 2A and 2B summarize the signaling flow between a User Equipment (UE), a source access node, and a target access node during a handover procedure.
Figure 2B:
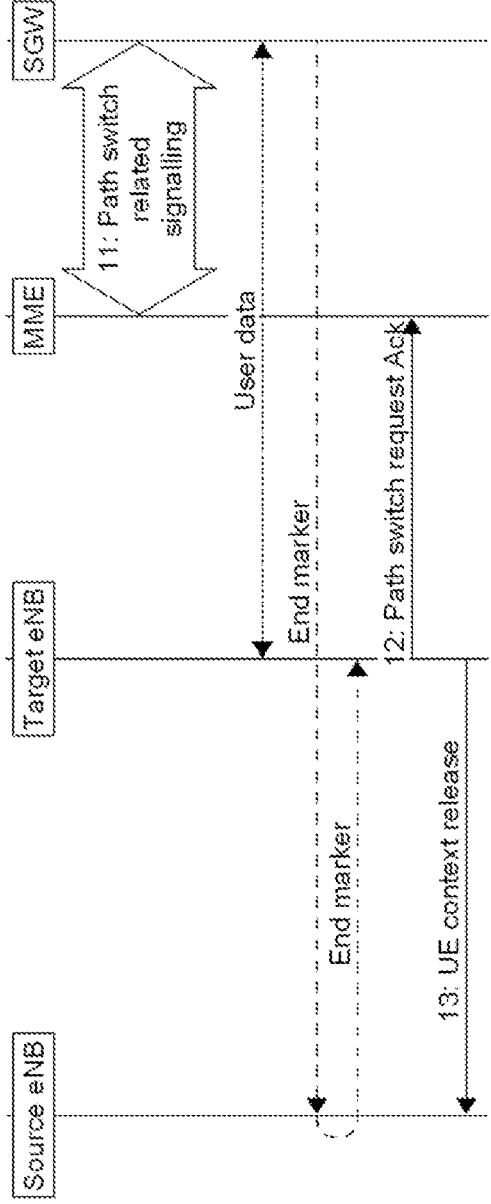
Figure 3:
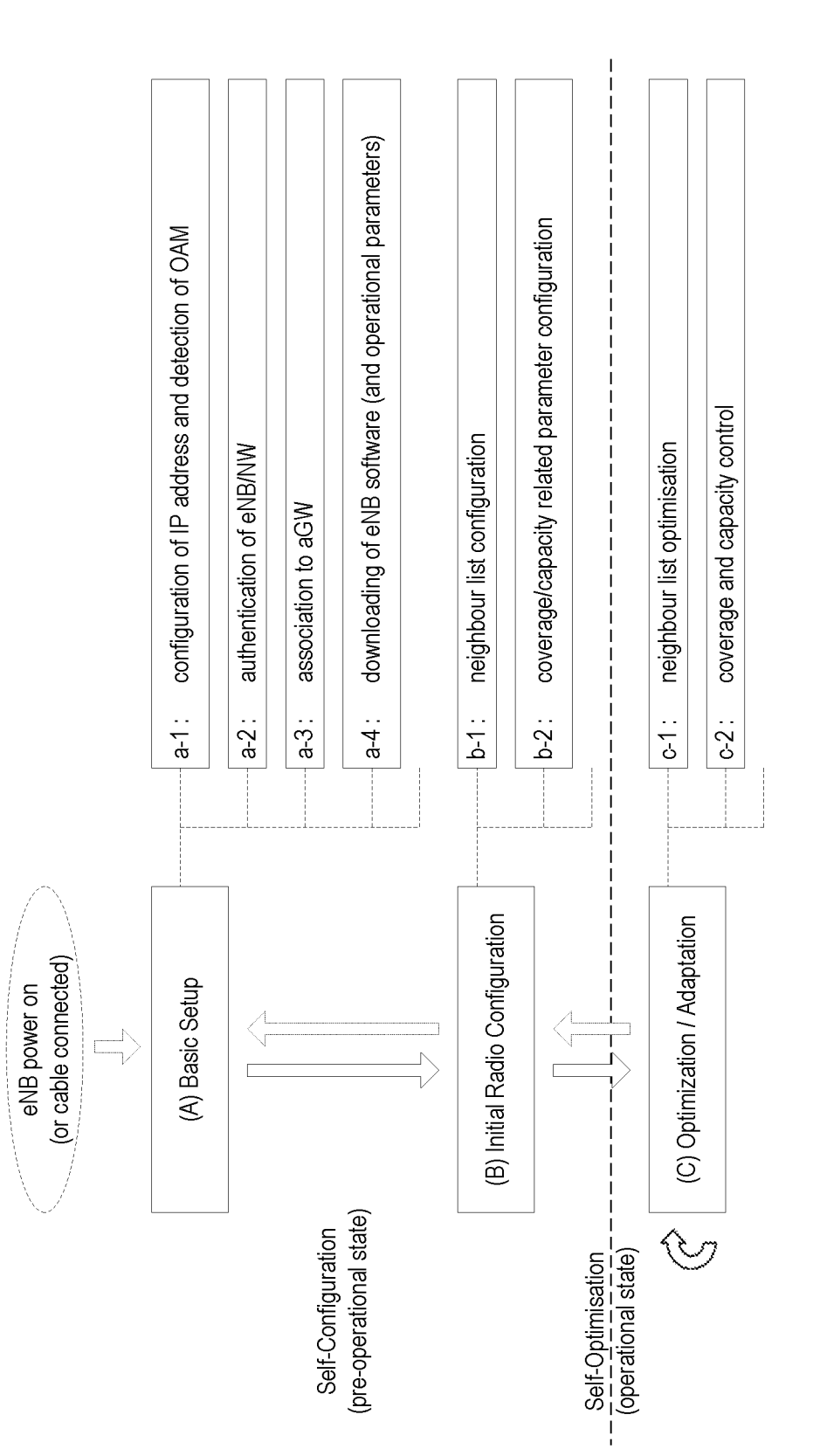
FIG. 3 illustrates ramifications of self-configuration or self-optimization functionality.
Figure 4:
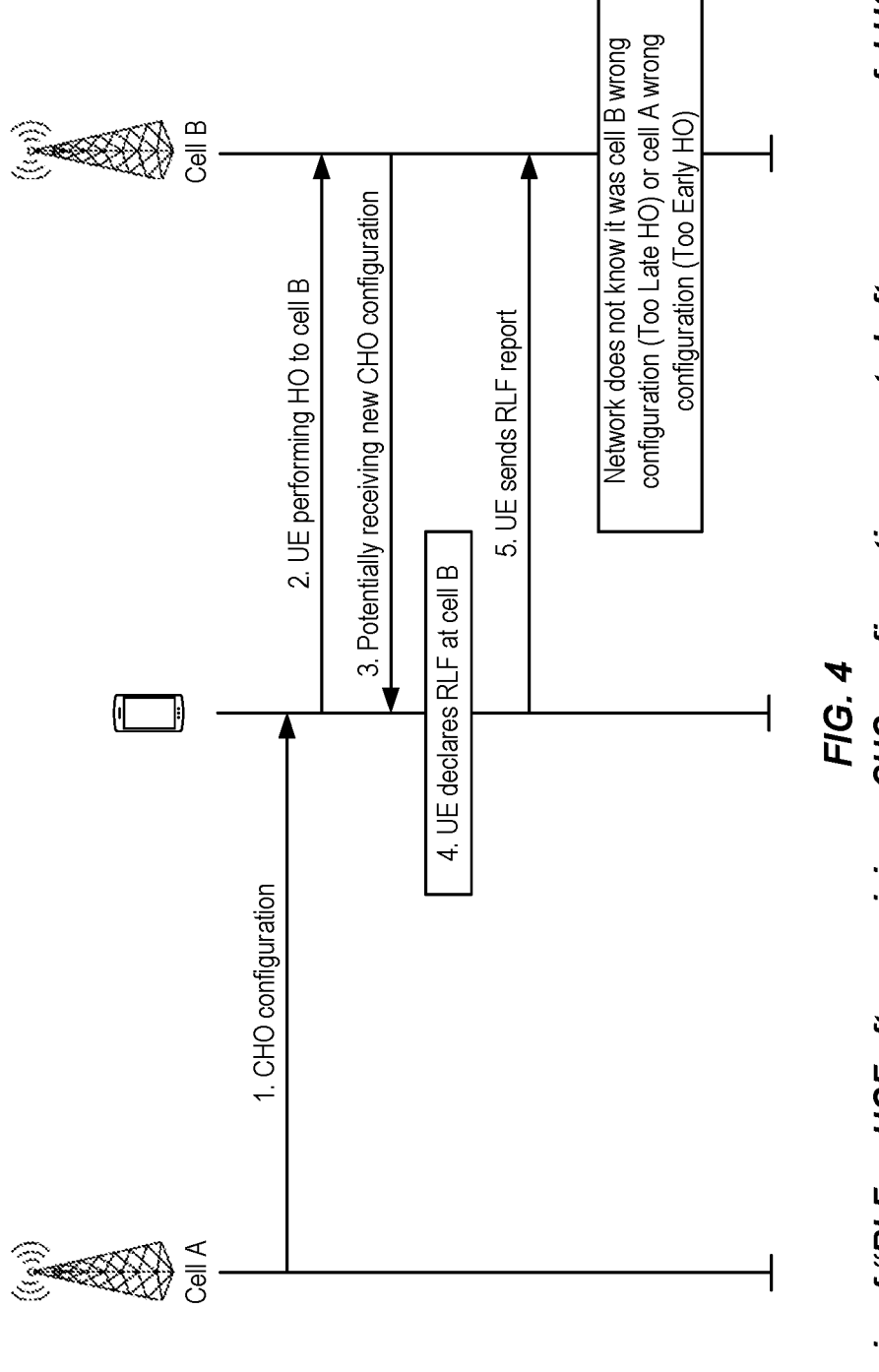
FIG. 4 illustrates a scenario of a Radio Link Failure (RLF) or Handover (HO) failure after receiving a Conditional HO (CHO) configuration executed after a successful HO.

There currently exist certain challenges. The problematic scenario associated with embodiments of the solutions described herein is depicted in FIG. 4. As illustrated, the UE receives a Conditional Handover (CHO) configuration from a Cell A (step 1), and it succeeds to perform handover (HO) to cell B (step 2). The UE may potentially receive a new CHO configuration from cell B (step 3). The UE may declare a Radio Link Failure (RLF) (e.g., due to the expiry of T310) at cell B (step 4). The UE logs the RLF report and sends the RLF report to the network (step 5). However, the teachings of the disclosure recognize the following. It is not clear to the network whether the first HO from cell A to cell B was wrongly configured or the cell B did not configure the UE properly before the RLF. In fact, cell A may have wrongly configured the UE with CHO configuration such that UE performed the HO earlier than the time it should have performed the HO. On the other hand, the issue may be that cell B that did not trigger the HO or CHO configuration for the UE in time such that UE declared the RLF. Such ambiguity would impede the network from determining whether the handover configuration of the cell A needs to be optimized (e.g., to avoid "too early" HO) or the handover configuration of the cell B needs to be optimized (e.g., to avoid "too late" HO).

Currently, after the RLF as per current legacy specification, the UE includes the timeConnFailure, i.e., the time elapsed since the last HO initialization until connection failure. In this scenario, assuming that cell B did not configure the UE with a CHO configuration, the last HO initialization occurred when cell A sent the HO command (or CHO configuration) to the UE. Assuming that cell B sends a CHO configuration to the UE, timeConnFailure will be the time elapsed since UE received the CHO configuration from cell B. However, the current RLF report does not allow the network to determine whether cell B configured the UE at a proper time or not.

In addition, since the UE deletes the CHO configuration (including the CHO candidate cells) after the CHO execution from cell A to cell B, the UE would not be able to provide the measurement of the CHO candidate cells after an RLF in the target cell (e.g., in case of too early HO). This impedes the UE from providing the radio link measurement for the CHO candidate cells of the source cell. Hence, source cell A may not be able to detect whether the candidate cells and their corresponding triggering thresholds (e.g., conditional even A3 and/or conditional event A5) were configured optimally.

Additionally, the UE might send a successful HO report towards cell B. Cell B would forward this successful HO report to the source cell, i.e., cell A. Based on this successful HO report, cell A would further increase the weightage (i.e., gain more confidence that these parameters were correct) towards the CHO parameters used for the CHO towards cell B as this was a successful CHO. However, if the UE declares a RLF in cell B, the CHO from cell A to cell B might be the cause for the RLF in cell B due to the too-early HO from cell A to cell B. Further, depending on whether the UE pops up in cell C, this could also be a HO to wrong cell. This would result in cell A penalizing the CHO parameters used for the CHO from cell A to cell B. Thus, in this scenario, the CHO parameters used from cell A to cell B would get penalized as well as reinforced based on a single CHO i.e., the network might perform contradicting actions based on a single HO.

Certain aspects of the present disclosure and their embodiments may provide solutions to these or other challenges. Certain embodiments of the disclosure provide a method of including a first set of information in the RLF report in the scenario in which RLF occurs after a successful CHO execution at the target cell wherein the said first set of information provides details associated with the successful CHO. The first set of information to be included in the RLF report includes one or more of the following: a successful HO report and CHO configuration received in the source cell (referred to herein as cell A). In some embodiments, the method enables the UE to store/keep/retain (i.e., store, keep, or retain) the information related to CHO configuration received from cell A after the CHO execution to the target cell, which is referred to herein as cell B, or after an ordinary HO execution to the cell B, until at least one of the following events:

UE executes a CHO from cell B to another cell e.g., cell C, or

UE executes an ordinary HO from cell B to another cell e.g., cell C, or

UE receives CHO configuration from cell B, or

UE declares RLF and logs RLF report, or

Until a timer expires wherein the timer could be network configured or explicitly specified in the specification (i.e., hard coded).

In some embodiments, the method enables the UE to log the elapsed time between CHO execution toward cell B and the time the UE received a new CHO configuration from cell B, if the UE receives any CHO configuration in cell B. In some embodiments, the method enables the UE to log the elapsed time between CHO execution toward cell B and the time UE declared an RLF in cell B independent of whether the UE received a new CHO configuration in cell B or not. In some embodiments, the method enables the UE to include a flag in the RLF report indicating whether the successful HO report included in the RLF report has been transmitted to the cell B or not. In some embodiments, the method enables the UE to discard a previously stored HO success Report, if that is associated to the same cell in which the UE experiences an RLF after being successfully handed-over to it.

Certain embodiments may provide one or more of the following technical advantages. Certain embodiments allow the network nodes to better classify the mobility failure types such as too early HO, too late HO, and HO to wrong cell and also ensures that successful HO report associated to a successful HO which was classified as too early HO or HO to wrong cell is not used for further reinforcing the HO parameters used in the said HO. Based on embodiments, the UE retains the CHO configuration (including the CHO candidate cells) of the source cell (so-called cell A) until it received new CHO configuration after being handed over to another cell (cell B), or until it experience a failure after being handed over to another cell (cell B). Retaining/keeping the CHO configuration of the serving cell A after the HO to cell B enables the UE to provide measurements of the CHO candidate cell after an RLF in the target cell. This can be beneficial for the source cell (e.g., cell A) to reconfigure the CHO candidate cells if the UE fails after execution of a CHO toward target cell. In addition, UE logs the time elapsed between CHO execution and receiving new CHO configuration from the target cell (cell B) as part of RLF report. This can be used by network node to detect whether the UE received the CHO configuration in time before failure or not. Providing in time CHO configuration form network node can avoid too late HO for the UE, so an RLF happening in the target cell (after execution of the CHO), would not be classified as too early HO, since the target cell may not be provided the CHO configuration on time.

Figure 5:
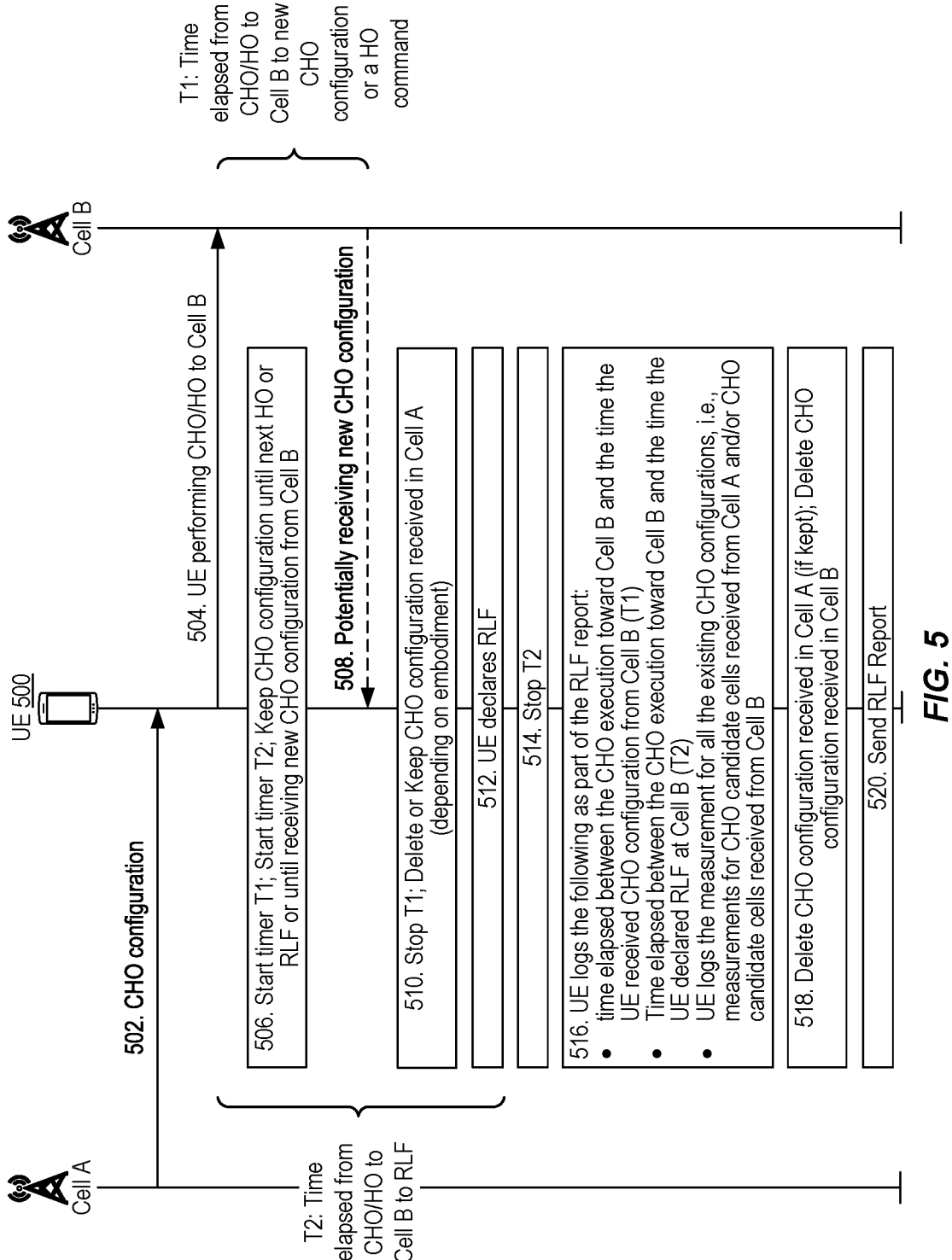
FIG. 5 illustrates a procedure in accordance with an embodiment of the present disclosure.

FIG. 5 illustrates a procedure in accordance with an embodiment of the present disclosure. The procedure involves a UE 500, cell A, and cell B. As illustrated, the procedure comprises the following actions executed by the UE 500:

Step 502: The UE 500 receives a Radio Resource Control (RRC) signal including a CHO configuration from cell A.

Steps 504-506: The UE 500 successfully completes a HO (e.g., a CHO) from cell A to cell B and keeps/stores/ retains the CHO configuration received in cell A.

The UE 500 starts timer T1 to measure the time between the successful completion of CHO towards cell B and receiving a new CHO configuration at the target cell B.

The UE 500 starts timer T2 to measure the time between the successful completion of CHO towards cell B and declaring RLF at the target cell B.

Step 508: The UE 500 receives, while connected to cell B, an RRCReconfiguration message including CHO configuration including candidate cells, or a handover command for ordinary non-CHO HO including reconfiguration with sync.

Step 510: In response thereto, the UE 500 may perform the following actions:

Stopping timer T1

In one embodiment, the UE 500 deletes the CHO configurations received in cell A.

In another embodiment, the UE 500 keeping/storing/ retaining the CHO configuration received at cell A in addition to the CHO configuration received in cell B.

Step 512: The UE 500 declares an RLF while being connected to cell B, e.g. T310 expiry. In response thereto, the UE 500 may perform the following actions:

Step 514: Stopping timer T2

Step 516: The UE 500 logs the following as part of the RLF report:

Logging the time elapsed between CHO execution to cell B, and the time UE received a CHO configuration from cell B or HO command from cell B (T1)

In one embodiment, the UE 500 may receive successive CHO configurations. In this case, for each RRC signal including CHO configuration, the UE 500 logs time elapsed between HO execution to cell B and the time of receiving that RRC signal including the CHO configuration.

In another embodiment, the UE 500 did not perform HO to the cell B and connected by means of initial access, RRC resume, or re-establishment. In this case, the UE 500 logs the time elapsed between being connected to the cell B (e.g., from RRC Setup or RRC resume or RRC re-establishment) and the time UE received the CHO configuration from cell B.

Logging the time elapsed between CHO execution to cell B (or HO execution to cell B) and the time the UE 500 declared RLF at cell B (T2)

Logging the radio link measurement for the CHO candidate cells received from cell A such as Reference Signal Received Power (RSRP), Reference Signal Received Quality (RSRQ), Signal to Interference plus Noise Ratio (SINR) at cell level and/or beam level for the Synchronization Signal Block (SSB) and/or Channel State Information (CSI) Reference Signal (CSI-RS) beams.

Step 518: The UE 500 deletes the CHO configurations received in cell A after logging the measurements for the CHO candidate cells. This is only if the CHO configurations received in cell A were not already deleted in step 510. The UE 500 also deletes the CHO configurations received in cell B after logging the measurements for the CHO candidate cells.

Step 520: The UE 500 sends the RLF-Report to the network via a solicitation mechanism.

Figure 6:
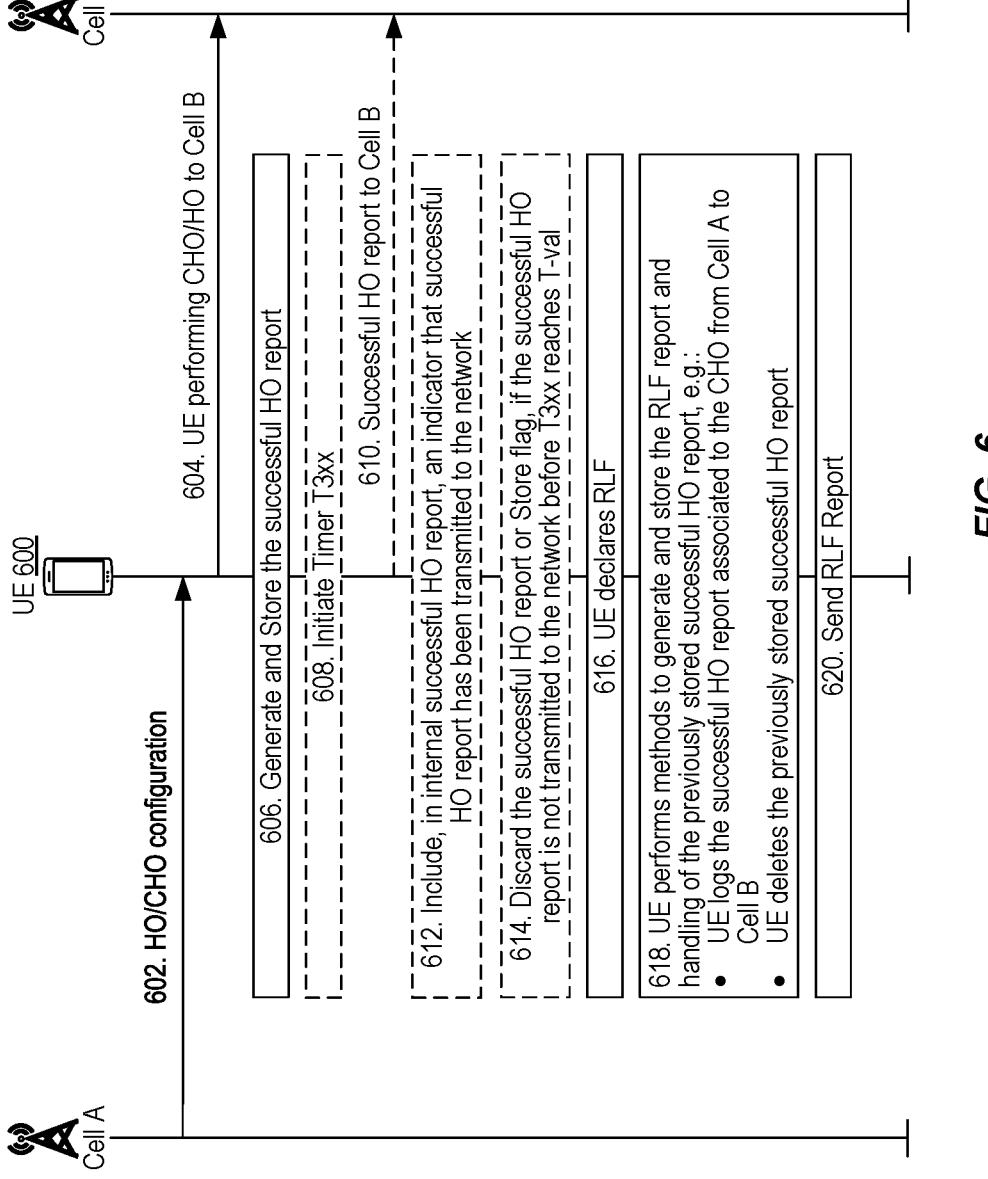
FIG. 6 illustrate a procedure in accordance with another embodiment of the present disclosure.

FIG. 6 illustrates a procedure in accordance with another embodiment of the present disclosure. The procedure involves a UE 600, cell A, and cell B. As illustrated, the procedure comprises the following actions executed by the UE 600:

Step 602: The UE 600 receives an RRC signal including a HO or CHO configuration from cell A.

Optionally, the UE 600 receives a value (T-val) for the timer T3xx. This timer value is to be used by the UE 600 to determine how long the UE 600 should keep the successful HO report if and upon successfully handing over (e.g., if the network configures 2 seconds as the value of this timer, then the UE 600 retains the successful HO report for at least 2 seconds to check the possibility of including this successful HO report in the RLF report).

Step 604: The UE 600 successfully completes the HO or CHO towards cell B.

Step 606: The UE 600 generates a successful HO report and stores it in an entry of container, e.g. in a var-HOSuccessReport. Note that the term "successful HO report" refers to a report of a successful HO or a successful CHO unless otherwise stated or required.

The successful HO report includes one or more measurements associated to the source cell of the just concluded HO, one or more measurements associated to the target cell of the just concluded HO, any available other neighbor cell measurements, location information, radio link monitoring status at the source cell of the just concluded HO, measurements related to the candidates of the CHO configuration, etc.

Step 608 (Optional): The UE 600 initiates the timer, T3xx.

Step 610 (Optional): In one embodiment, the UE 600 sends the successful HO report to the Cell-B. If timer T3xx is used, the UE 600 sends the successful HO report to cell B before the timer T3xx has expired (i.e., before the timer T3xx exceeds T-val).

Step 612 (Optional): After transmission of the successful HO report, the UE 600 includes an indicator in the UE internal successful HO report, the indicator indicating that the successful HO report has been transmitted to the network.

Step 614: If the timer T3xx value exceeds T-val before the UE 600 is able to send the successful HO report:

In one embodiment, the UE 600 discards the successful HO report.

In another embodiment, the UE 600 stores a flag in the successful HO report indicating that the timer T3xx has expired.

Step 616: The UE 600 declares an RLF while being connected to cell B, e.g. T310 expiry.

Step 618: In response to declaring the RLF, the UE 600 performs one or more action to generate and store the RLF report and handle the previously stored successful HO report. These one or more actions may include, e.g.:

Generating the RLF report and storing it.

In one embodiment, if T3xx is used and if the current value of T3xx is less than T-val, then the UE 600 includes/appends the successful HO report with the RLF report and deletes the stored successful HO Report from the container in which it was stored.

In some embodiments, the UE 600 includes the current value of T3xx in the RLF report.

In another embodiment, e.g. in case T3xxx is not used, the already generated and stored successful HO report for the cell B is deleted from the container in which it was stored, if RLF is declared in the same cell B and no other handovers have been executed by the UE 600 since entering this cell B. In another embodiment, the UE 600 appends the successful HO report in this newly generated RLF report, and deletes the stored successful HO report from the container in which it was stored.

The method of the previous embodiments, wherein the deleting of the HO success report, implies deleting the entry, corresponding to the concerned Successful HO Report, from the container in which the concerned Successful HO Report was stored in step 604.

Step 620: The UE 600 sends the RLF-Report to the network via a solicitation mechanism.

A combination of the method mentioned in FIG. 5 and FIG. 6 is not precluded.

Figure 7A:
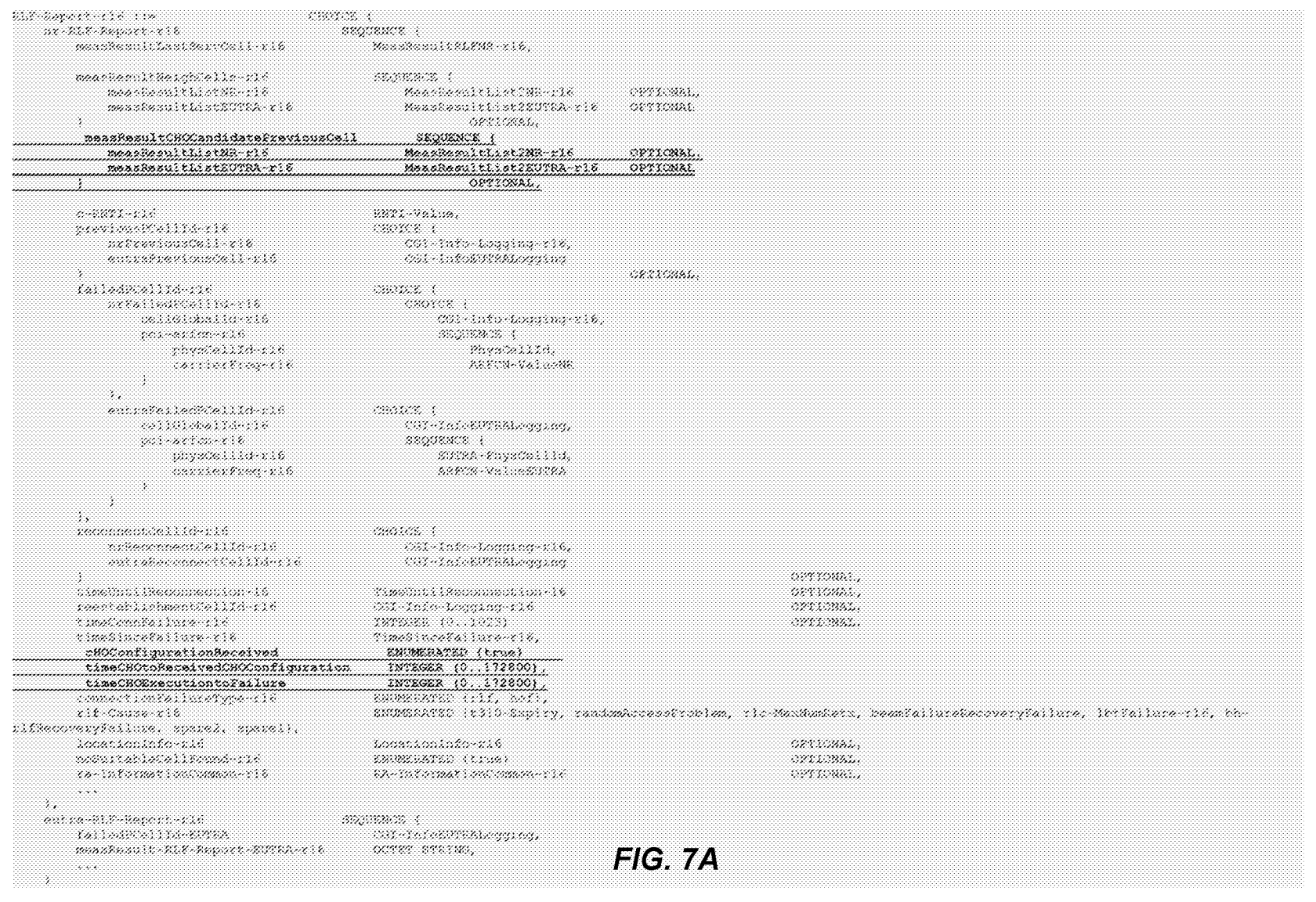

The following relates to an example implementation associated with FIG. 5 related embodiments. The solution proposed in this method comprises information to be logged as part of the RLF-report, and it can be implemented in a non-limiting example as shown in FIGS. 7A and 7B.

In regard to network embodiment, upon receiving the information included in the above embodiment, the network will be able to optimize the HO configuration and related parameters for the CHO configuration or HO configuration from cell A to cell B, as well as CHO configuration or the HO configuration from cell B to any other cell.

For example, if from the above information, the network node determines that the RLF occurred after configuring CHO configuration at cell B, the network can optimize the CHO configuration at cell B. Otherwise if there was not a CHO configuration, cell B may require to configure an optimized CHO configuration for the UEs. However, if the time from the HO to the failure is short enough the failure can be classified as a too early failure and hence cell A should optimize its CHO configuration.

The network node can use the measResultCHOCandidatePreviousCell to verify the radio quality and the signal strength of the CHO candidate cells configured by cell A and possibly determine if the HO was a HO to wrong cell, i.e. if the CHO candidate cells associated measurements show a good quality and the time elapsed since HO from cell A to cell B was short, the HO can be classified as a CHO to wrong cell.

Figure 8:
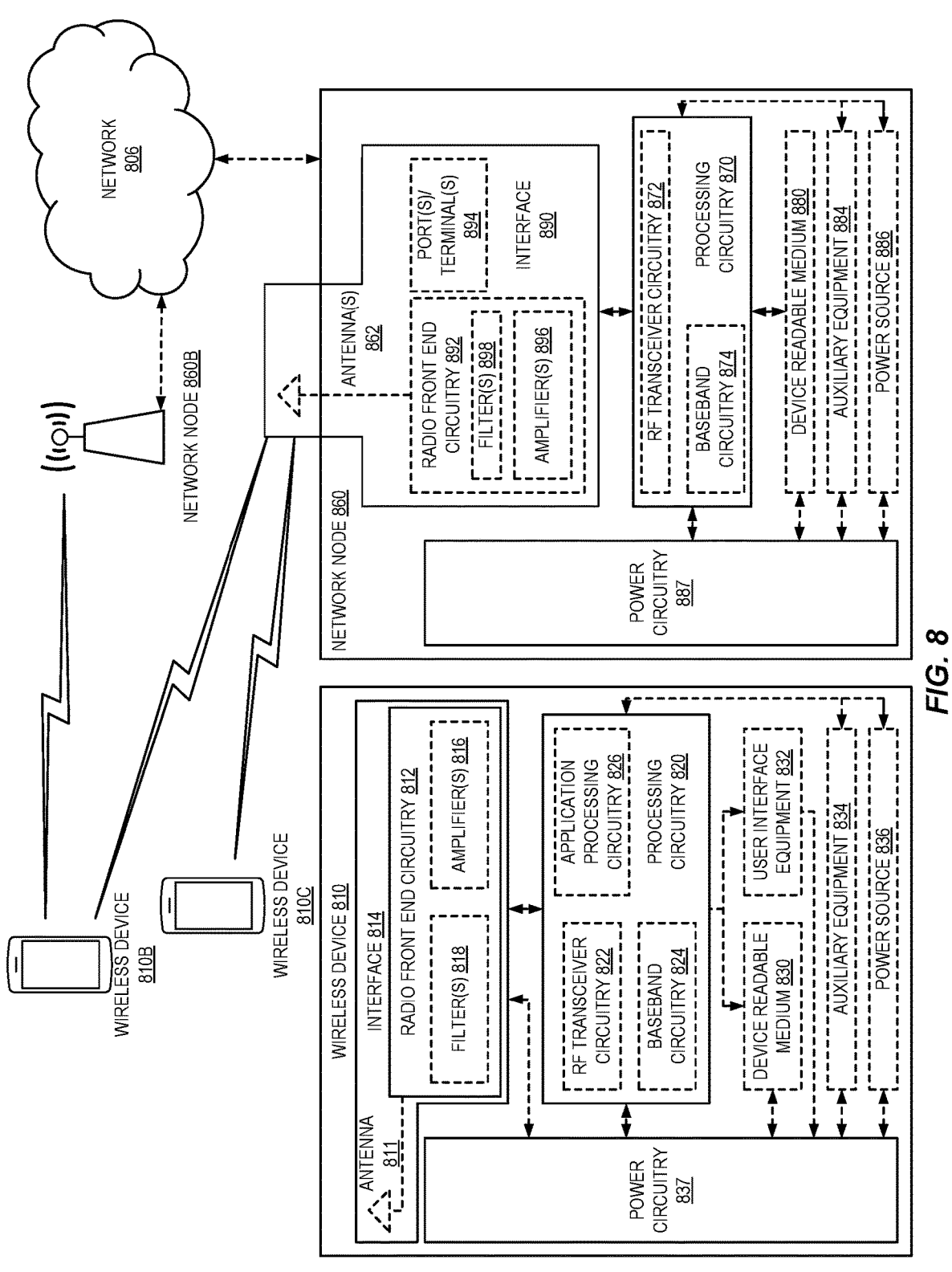
FIG. 8 illustrates an example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR Node Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a Node B component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple Node Bs. In such a scenario, each unique Node B and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices, and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
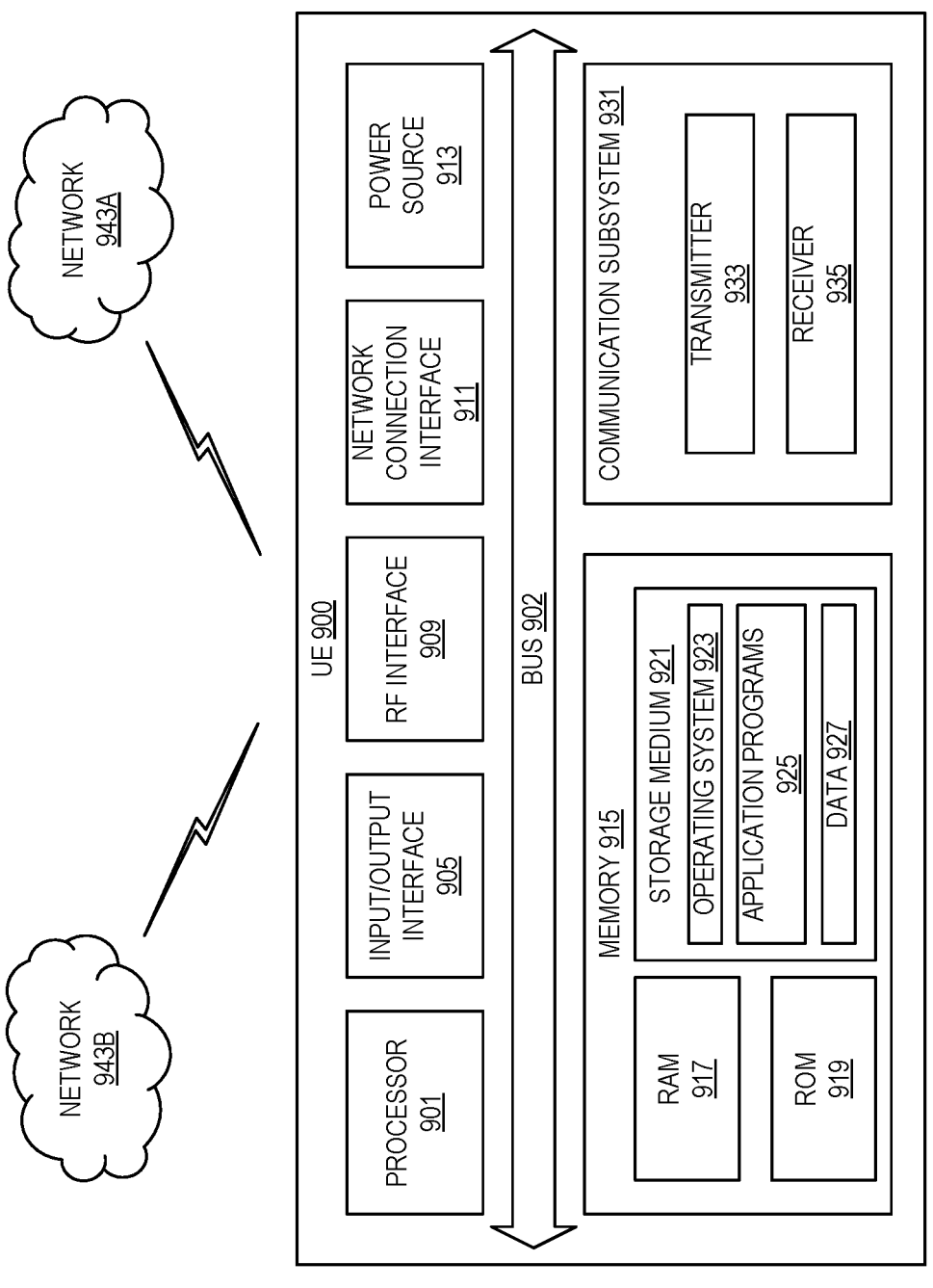
FIG. 9 illustrates one embodiment of a UE in accordance with various aspects described herein.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by the 3$^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
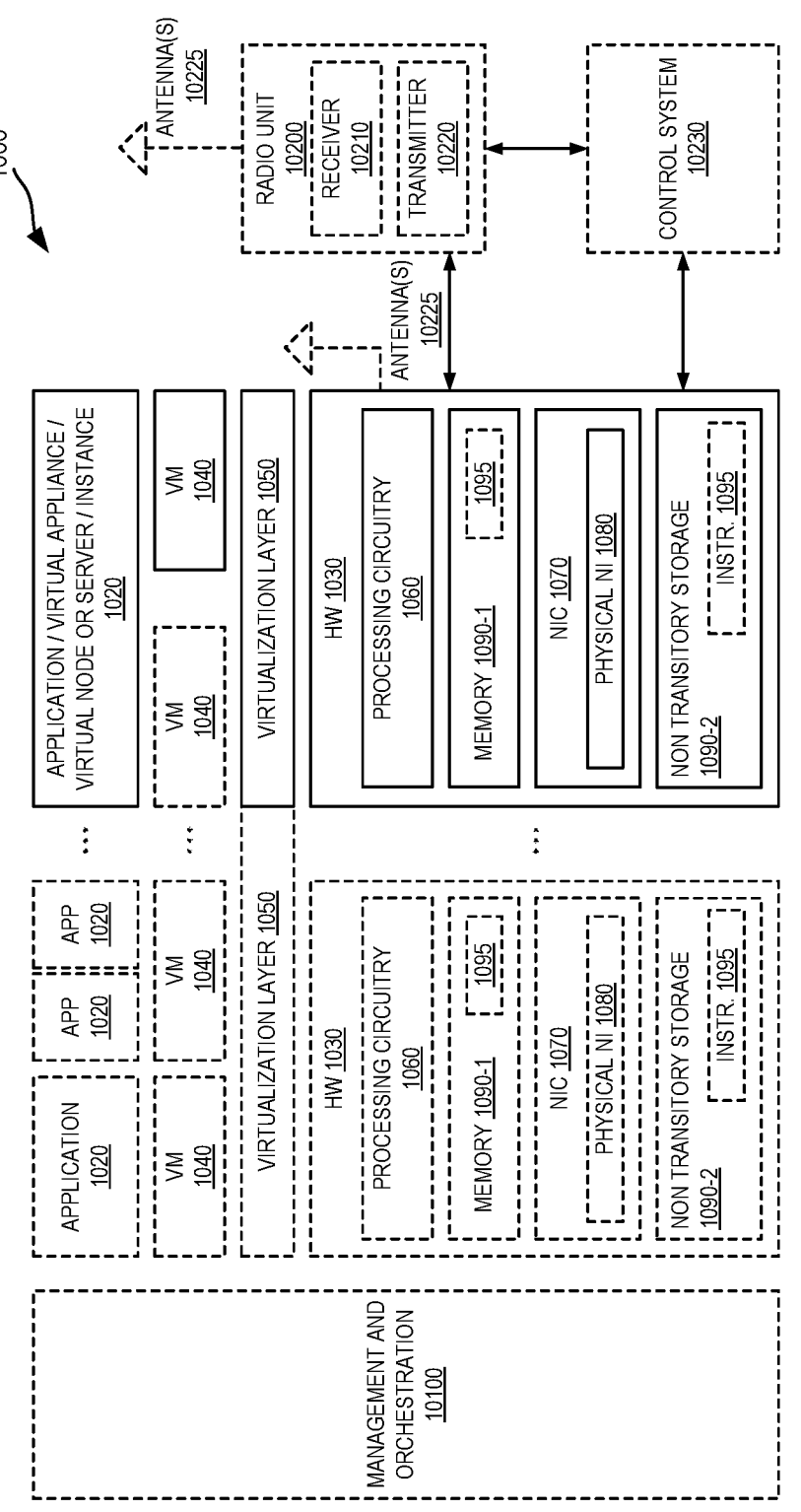
FIG. 10 is a schematic block diagram illustrating a virtualization environment in which functions implemented by some embodiments may be virtualized.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g., such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be effected with the use of control system 10230 which may alternatively be used for communication between the hardware nodes 1030 and radio units 10200.

Figure 11:
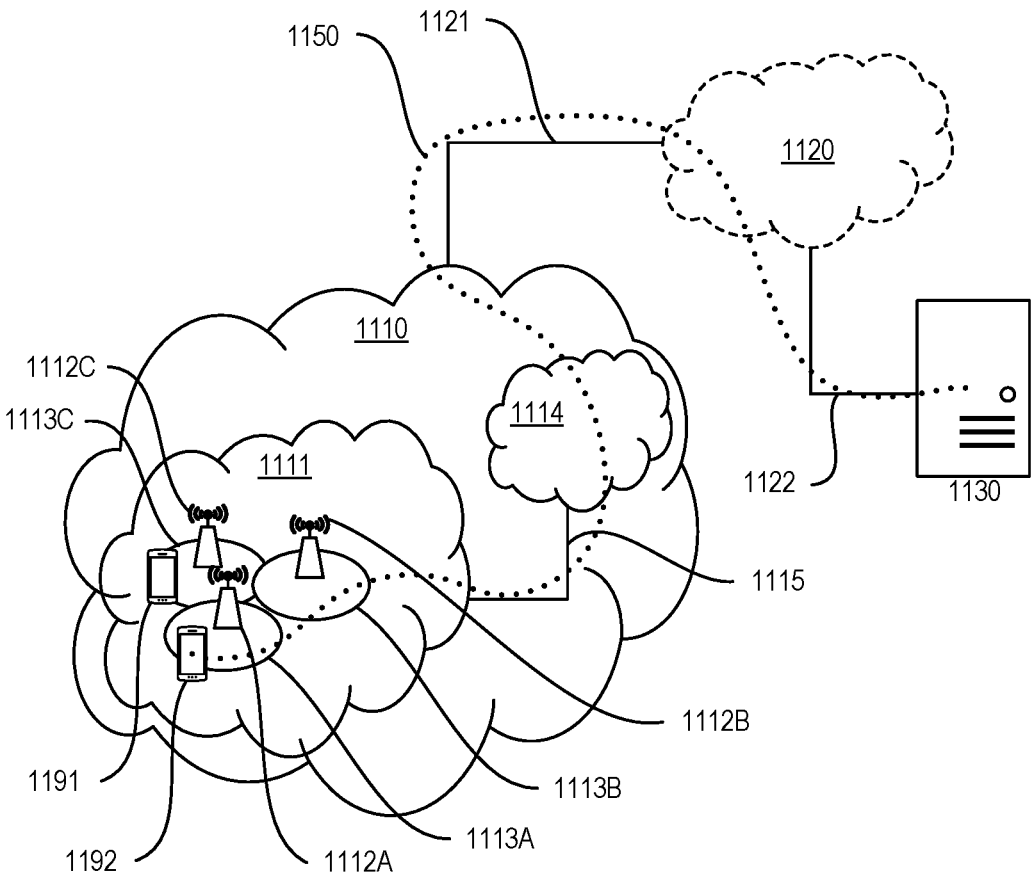
FIG. 11 illustrates an example embodiment of a communication system in which embodiments of the present disclosure may be implemented.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
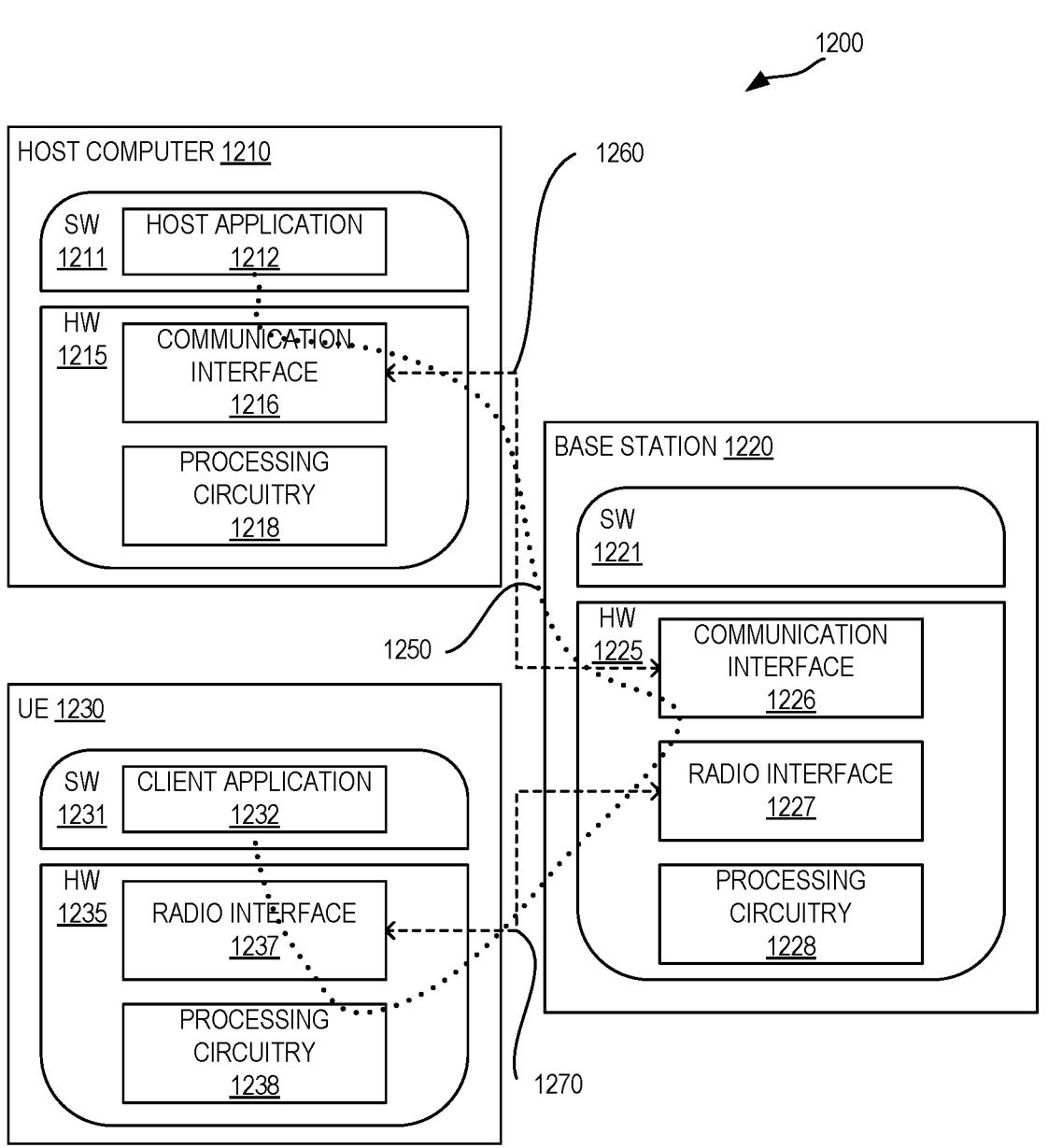
FIG. 12 illustrates example embodiments of the host computer, base station, and UE of FIG. 11.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve, e.g. data rate, latency, power consumption and thereby provide benefits such as, e.g. reduced user waiting time, relaxed restriction on file size, better responsiveness, and extended battery lifetime.

A measurement procedure may be provided for the purpose of monitoring data rate, latency, and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figures 13, 14:
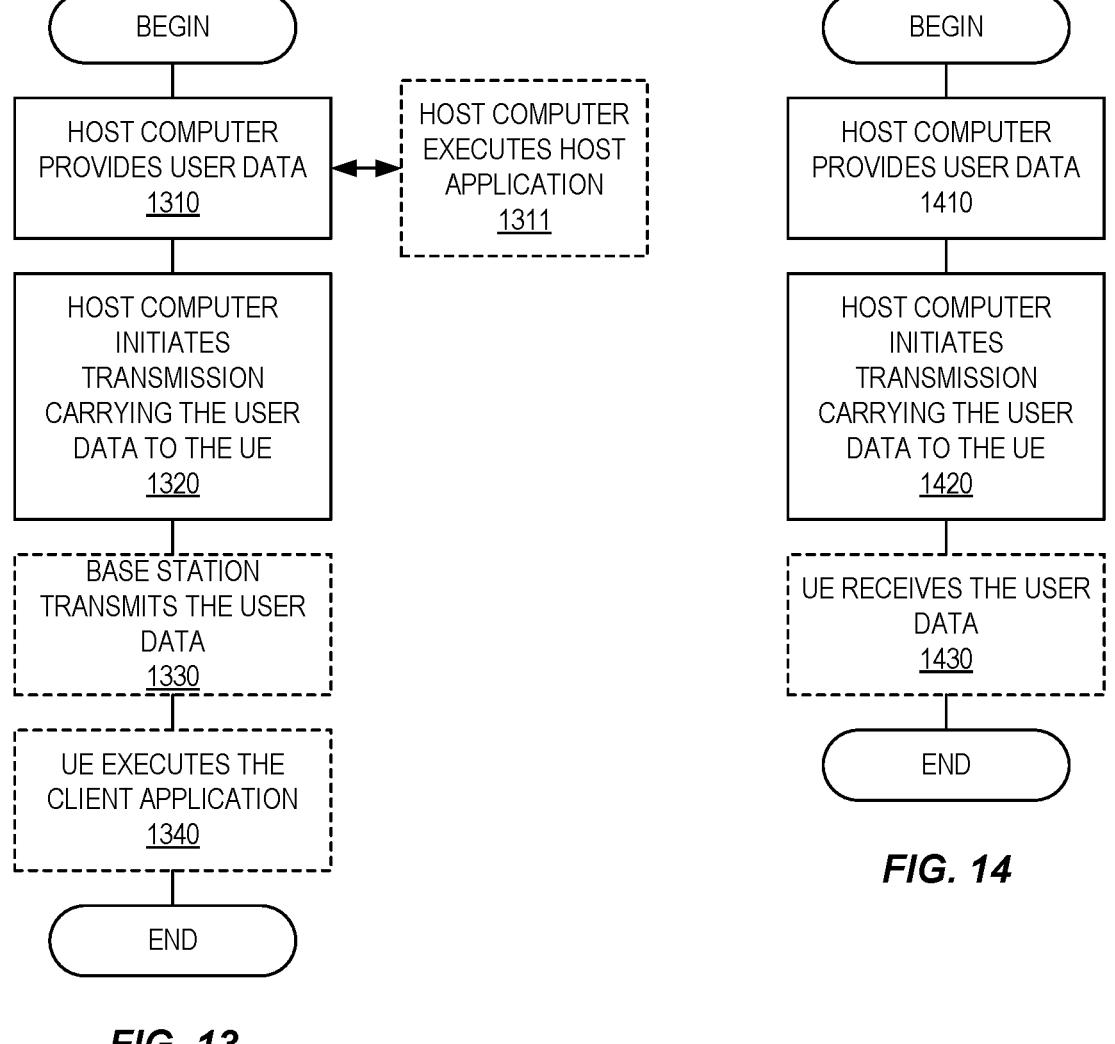
FIGS. 13 through 16 are flow charts that illustrate example embodiments of methods implemented in a communication system such as that of FIG. 11.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 15, 16:
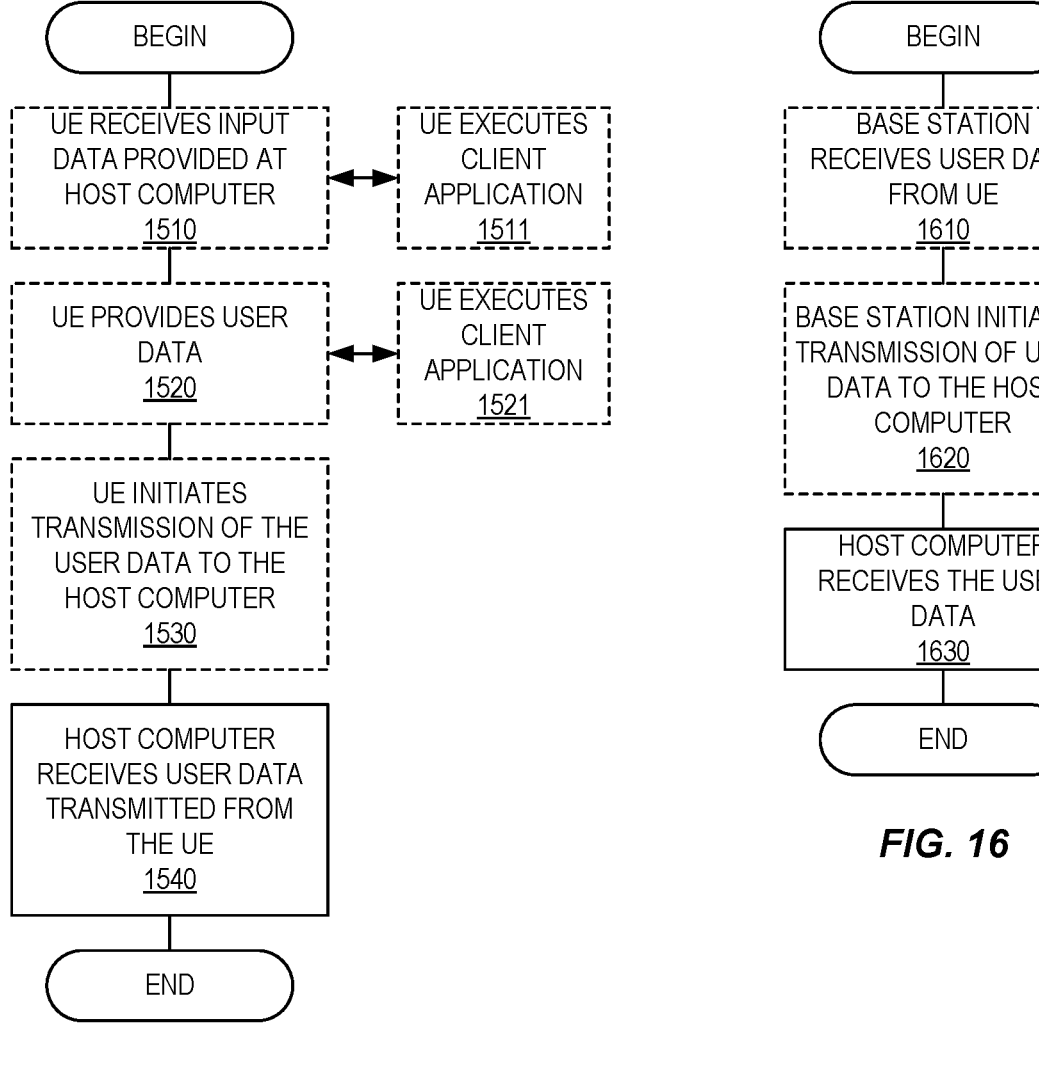

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Some example embodiments of the present disclosure are as follows:

Group A Embodiments

Embodiment 1: A method performed by a wireless device for handover from a source cell to a target cell, the method comprising:

Including, in a radio link failure (RLF) report, one or more of:

a conditional handover (CHO) configuration received in the source cell; and a successful handover (HO) report.

Embodiment 2: The method of embodiment 1, and further comprising storing, by the wireless device, the CHO configuration until at least one of the following:

the wireless device executes a CHO from the target cell to another cell;

the wireless device executes an ordinary HO from the target cell to another cell;

the wireless device receives CHO configuration from the target cell;

the wireless device declares RLF and logs RLF report; or a timer expires.

Embodiment 3: The method of embodiment 1 or 2, and further comprising the wireless device logging an elapsed time between CHO execution toward the target cell and a time the wireless device received a new CHO configuration from the target cell, if the wireless device receives any CHO configuration in the target cell.

Embodiment 4: The method of embodiment 1 or 2, and further comprising the wireless device logging an elapsed time between CHO execution toward the target cell and a time the wireless device declared an RLF in the target cell independent of whether the wireless device received a new CHO configuration in the target cell or not.

Embodiment 5: The method of embodiment 1 or 2, and further comprising the wireless device including a flag in the RLF report indicating whether the successful HO report included in the RLF report has been transmitted to the target cell or not.

Embodiment 6: The method of embodiment 1 or 2, and further comprising the wireless device discarding a previously stored HO success report, if that is associated with the same cell in which the wireless device experiences an RLF after being successfully handed-over to.

Embodiment 7: A method performed by a wireless device for handover from a source cell to a target cell, the method comprising: receiving an RRC signal including a conditional handover (CHO) configuration from the source cell; and successfully completing a handover (HO) to the target cell and retaining the CHO configuration after successful completion of the HO.

Embodiment 8: The method of the previous embodiment, and further comprising measuring a first time between successful completion of the HO to the target cell and any receipt of a new CHO configuration at the target cell.

Embodiment 9: The method of any of the previous two embodiments, and further comprising measuring a second time between successful completion of HO to the target cell and any declaration of radio link failure (RLF) at the target cell.

Embodiment 10: The method of any of the previous three embodiments, and further comprising receiving an RRCReconfiguration message including an additional CHO configuration including candidate cells or a handover command for ordinary non-CHO HO including reconfiguration with sync.

Embodiment 11: The method of any of embodiments 7-10, and further comprising deleting the CHO configuration from the source cell.

Embodiment 12: The method of any of embodiments 7-11, and further comprising concurrently retaining the CHO configuration from the source cell and another CHO configuration from another cell.

Embodiment 13: The method of any of embodiments 7-12, and further comprising declaring a radio link failure (RLF) while being connected to the target cell.

Embodiment 14: The method of any of embodiments 7-13, and further comprising logging the first time or the second time.

Embodiment 15: The method of any of embodiments 7-14, and further comprising: logging a radio link measurement for a CHO candidate cell; and deleting a CHO configuration from the source cell after logging the radio link measurement.

Embodiment 16: The method of any of embodiments 7-14, and further comprising: logging a radio link measurement for a CHO candidate cell; and deleting a CHO configuration from the target cell after logging the radio link measurement.

Embodiment 17: The method of any of embodiments 7-16, and further comprising sending a radio link failure report (RLF-Report) to a network associated with the source cell and the target cell.

Embodiment 18: A method performed by a wireless device for handover (HO) from a source cell to a target cell, the method comprising:

receiving an RRC signal including a handover (HO) configuration or conditional handover (CHO) configuration from the source cell;

successfully completing HO to the target cell;

generating and storing a successful HO report; and declaring a radio link failure (RLF) while being connect to the target cell.

Embodiment 19: The method of embodiment 18, and further comprising retaining the successful handover report for a predetermined time period.

Embodiment 20: The method of embodiment 19, and further comprising discarding the successful handover report after the predetermined time period.

Embodiment 21: The method of any of embodiments 19 and 20, and further comprising receiving a value setting the predetermined time period for which the successful handover report will be retained.

Embodiment 22: The method of any of embodiments 18-21, and further comprising sending the successful handover report to the target cell and storing an indication in a copy of the handover report stored at the wireless device that the handover report has been sent to the target cell.

Embodiment 23: The method of embodiment 19, and further comprising storing a flag in the handover report indicating that the predetermined time period has expired.

Embodiment 24: The method of any of the embodiments 18-23, and further comprising sending a radio link failure report (RLF-Report) to a network associated with the source call and the target cell.

Embodiment 25: The method of embodiment 24, and further comprising including the successful handover report within the RLF report and deleting the stored successful HO report from the container in which it was stored.

Embodiment 26: The method of any of embodiments 18-25, and further comprising receiving a first timer value indicative of how long the wireless device should keep a successful HO report upon successful handover.

Embodiment 27: The method of embodiment 24, wherein the RLF-Report is sent to the network by a solicitation mechanism.

Embodiment 28: The method of embodiment 24 or 27, and further comprising including a second timer value in the RLF-Report report indicative of a time that has transpired since successful handover.

Embodiment 29: The method of any of the previous embodiments, further comprising providing user data and forwarding the user data to a host computer via transmission to a base station.

Group B Embodiments

Embodiment 30: A wireless device for handover from a source cell to a target cell, the wireless device comprising:

processing circuitry configured to perform any of the steps of any of the Group A embodiments; and power supply circuitry configured to supply power to the wireless device.

Embodiment 31: A user equipment (UE) for handover from a source cell to a target cell, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Embodiment 32: A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Embodiment 33: The communication system of the previous embodiment, wherein the cellular network further includes a base station configured to communicate with the UE.

Embodiment 34: The communication system of the previous 2 embodiments, wherein:

the processing circuitry of the host computer is configured to execute a host application, thereby providing the user data; and the UE's processing circuitry is configured to execute a client application associated with the host application.

Embodiment 35: A method implemented in a communication system including a host computer, a base station, and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

Embodiment 36: The method of the previous embodiment, further comprising at the UE, receiving the user data from the base station.

Embodiment 37: A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

Embodiment 38: The communication system of the previous embodiment, further including the UE.

Embodiment 39: The communication system of the previous 2 embodiments, further including the base station, wherein the base station comprises a radio interface configured to communicate with the UE and a communication interface configured to forward to the host computer the user data carried by a transmission from the UE to the base station.

Embodiment 40: The communication system of the previous 3 embodiments, wherein:

the processing circuitry of the host computer is configured to execute a host application; and the UE's processing circuitry is configured to execute a client application associated with the host application, thereby providing the user data.

Embodiment 41: The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

Embodiment 42: A method implemented in a communication system including a host computer, a base station, and a user equipment (UE), the method comprising: at the host computer, receiving user data transmitted to the base station from the UE, wherein the UE performs any of the steps of any of the Group A embodiments.

Embodiment 43: The method of the previous embodiment, further comprising, at the UE, providing the user data to the base station.

Embodiment 44: The method of the previous 2 embodiments, further comprising:

at the UE, executing a client application, thereby providing the user data to be transmitted; and at the host computer, executing a host application associated with the client application.

Embodiment 45: The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

Embodiment 46: A method implemented in a communication system including a host computer, a base station, and a user equipment (UE), the method comprising: at the host computer, receiving, from the base station, user data originating from a transmission which the base station has received from the UE, wherein the UE performs any of the steps of any of the Group A embodiments.

Embodiment 47: The method of the previous embodiment, further comprising at the base station, receiving the user data from the UE.

Embodiment 48: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method performed by a wireless device for conditionally triggered handover from a source cell to a target cell, the method comprising:

receiving a conditionally triggered handover configuration from the source cell;

successfully completing the conditionally triggered handover to the target cell;

declaring a radio link failure, RLF, in association with the conditionally triggered handover to the target cell;

generating a RLF report responsive to declaring the RLF, the RLF report comprising:

information about an amount of time between execution of the successfully completed conditionally triggered handover to the target cell and declaring the RLF while being connected to the target cell, and transmitting the RLF report to a network node.

2. The method of claim 1, wherein the RLF report further comprises one or more of:

the conditionally triggered handover configuration received from the source cell, information about an amount of time between successfully completing the conditionally triggered handover to the target cell and reception of a new conditionally triggered handover configuration from the target cell, or one or more radio link measurements for one or more conditionally triggered handover candidate cells associated to the conditionally triggered handover configuration received from the source cell.

3. The method of claim 2 further comprising:

generating and storing a successful conditionally triggered handover report responsive to successfully completing the to the target cell.

4. The method of claim 3 further comprising transmitting the successful conditionally triggered handover report to the target cell.

5. The method of claim 1 further comprising retaining the conditionally triggered handover configuration received from the source cell after successfully completing the conditionally triggered handover to the target cell.

6. The method of claim 5 wherein retaining the conditionally triggered handover received from the source cell after successfully completing the conditionally triggered handover to the target cell comprises retaining the conditionally triggered handover received from the source cell at least until the wireless device executes a handover from the target cell to another cell.

7. The method of claim 5 wherein retaining the conditionally triggered handover configuration received from the source cell after successfully completing the conditionally triggered handover to the target cell comprises retaining the conditionally triggered handover configuration received from the source cell at least until the wireless device receives a new conditionally triggered handover configuration from the target cell.

8. The method of claim 5 wherein retaining the conditionally triggered handover configuration received from the source cell after successfully completing the conditionally triggered handover to the target cell comprises retaining the conditionally triggered handover configuration received from the source cell at least until declaring the RLF while connected to the target cell.

9. The method of claim 5 wherein retaining the conditionally triggered handover configuration received from the source cell after successfully completing the conditionally triggered handover to the target cell comprises retaining the conditionally triggered handover configuration received from the source cell at least until a predefined or network configured timer has expired.

10. The method of claim 5 wherein the RLF report comprises one or more radio link measurements for one or more conditionally triggered handover candidate cells associated to the conditionally triggered handover configuration received from the source cell.

11. The method of claim 1 further comprising discarding the conditionally triggered handover configuration received from the source cell after successfully completing the conditionally triggered handover to the target cell.

12. The method of claim 1 wherein the RLF report comprises the information about the amount of time between successfully completing the conditionally triggered handover to the target cell and reception of a new conditionally triggered handover configuration from the target cell.

13. The method of claim 12 further comprising:

starting a first timer for the amount of time between successfully completing the conditionally triggered handover to the target cell and reception of a new conditionally triggered handover configuration from the target cell;

receiving a new conditionally triggered handover configuration from the target cell; and stopping the first timer responsive to receiving the new conditionally triggered handover configuration from the target cell;

wherein the RLF report comprises a value of the first timer.

14. A wireless device for conditionally triggered handover from a source cell to a target cell, the wireless device adapted to:

receive a conditionally triggered handover configuration from the source cell;

successfully completing the conditionally triggered handover to the target cell;

declare a radio link failure, RLF, in association with the conditionally triggered handover to the target cell;

generate a RLF report responsive to declaring the RLF, the RLF report comprising:

information about an amount of time between execution of the successfully completed conditionally triggered handover HO or CHO to the target cell and declaring the RLF while being connected to the target cell, and transmit the RLF report to a network node.

* * * * *